(12) United States Patent
Yamaguchi

(10) Patent No.: US 8,896,670 B2
(45) Date of Patent: Nov. 25, 2014

(54) IMAGE PROCESSING DEVICE, IMAGE PROCESSING METHOD, AND PROGRAM

(75) Inventor: Tadashi Yamaguchi, Saitama (JP)

(73) Assignee: Sony Corporation, Tokyo (JP)

( * ) Notice: Subject to any disclaimer, the term of this patent is extended or adjusted under 35 U.S.C. 154(b) by 528 days.

(21) Appl. No.: 13/252,473

(22) Filed: Oct. 4, 2011

(65) Prior Publication Data

US 2012/0147145 A1 Jun. 14, 2012

(30) Foreign Application Priority Data

Dec. 9, 2010 (JP) ................................ 2010-274806

(51) Int. Cl.
*H04N 13/02* (2006.01)
*H04N 13/00* (2006.01)

(52) U.S. Cl.
CPC ....... *H04N 13/0239* (2013.01); *H04N 13/0289* (2013.01); *H04N 13/0055* (2013.01)
USPC ................... 348/47; 348/46; 348/48; 348/49; 348/50; 348/51; 348/52; 348/53; 348/54; 348/55; 348/56; 348/57; 348/58; 348/59; 348/60

(58) Field of Classification Search
CPC .......... H04N 13/0239; H04N 13/0296; H04N 13/0055; H04N 2013/0081; H04N 13/0289; G06T 7/002
USPC .......................................................... 348/47
See application file for complete search history.

(56) References Cited

U.S. PATENT DOCUMENTS

| | | | | |
|---|---|---|---|---|
| 6,670,933 | B1 * | 12/2003 | Yamazaki | 345/1.1 |
| 6,829,008 | B1 * | 12/2004 | Kondo et al. | 348/302 |
| 7,453,489 | B2 * | 11/2008 | Ezawa | 348/51 |
| 8,436,893 | B2 * | 5/2013 | McNamer et al. | 348/50 |
| 8,654,195 | B2 * | 2/2014 | Ishiyama et al. | 348/135 |

(Continued)

FOREIGN PATENT DOCUMENTS

| | | |
|---|---|---|
| JP | 2001-61164 | 3/2001 |
| JP | 3186448 | 5/2001 |

(Continued)

OTHER PUBLICATIONS

Cheng et al, A hardware architecture for real-time stereoscopic image generation from depth map, Jul. 2011.*

(Continued)

*Primary Examiner* — Andy Rao
*Assistant Examiner* — Shan Elahi
(74) *Attorney, Agent, or Firm* — Oblon, Spivak, McClelland, Maier & Neustadt, L.L.P.

(57) ABSTRACT

An image processing device includes a distance data analysis unit that analyzes subject distance information with the partial region units of captured images having different viewpoints, and a data generation unit that determines whether a recorded image or an output image is set to a two-dimensional image or set to a three-dimensional image depending on the analysis result, and generates the recorded or output image based on the determination result, wherein the data generation unit determines a recall level of stereoscopic vision in three-dimensional display based on the analysis result, and if it is determined that the recall level of stereoscopic vision is low, generates a two-dimensional image as the recorded or output image, and if it is determined that the recall level of stereoscopic vision is high, generates a three-dimensional image as the recorded or output image.

10 Claims, 19 Drawing Sheets

(56) References Cited

U.S. PATENT DOCUMENTS

| | | | |
|---|---|---|---|
| 2004/0189795 A1* | 9/2004 | Ezawa | 348/51 |
| 2004/0227992 A1* | 11/2004 | Putilin et al. | 359/462 |
| 2005/0089212 A1* | 4/2005 | Mashitani et al. | 382/154 |
| 2007/0285339 A1* | 12/2007 | Yamazaki | 345/1.1 |
| 2008/0143751 A1* | 6/2008 | Chosokabe | 345/654 |
| 2009/0128646 A1* | 5/2009 | Itoh | 348/220.1 |
| 2009/0225217 A1* | 9/2009 | Katsuda et al. | 348/366 |
| 2010/0138887 A1* | 6/2010 | Nakata | 725/110 |
| 2011/0012995 A1* | 1/2011 | Watanabe et al. | 348/47 |
| 2011/0025825 A1* | 2/2011 | McNamer et al. | 348/46 |
| 2011/0025829 A1* | 2/2011 | McNamer et al. | 348/50 |
| 2011/0255775 A1* | 10/2011 | McNamer et al. | 382/154 |
| 2011/0286531 A1* | 11/2011 | Okajima | 375/240.25 |
| 2012/0105611 A1* | 5/2012 | Godar | 348/54 |
| 2012/0162374 A1* | 6/2012 | Markas et al. | 348/46 |

FOREIGN PATENT DOCUMENTS

| | | | |
|---|---|---|---|
| JP | 2002-245451 | 8/2002 | |
| JP | 2005-167310 | 6/2005 | |
| JP | 2009-192605 | 8/2009 | |
| JP | 2010-161492 | 7/2010 | |
| JP | 2010-252046 | 11/2010 | |
| WO | WO 2011058876 A1 * | 5/2011 | H04N 5/225 |

OTHER PUBLICATIONS

Yao et al, Study on methods for synthesizing binocular stereoscopic images, 2011.*

Office Action issued May 20, 2014 in Japanese Patent Application No. 2010-274806.

* cited by examiner

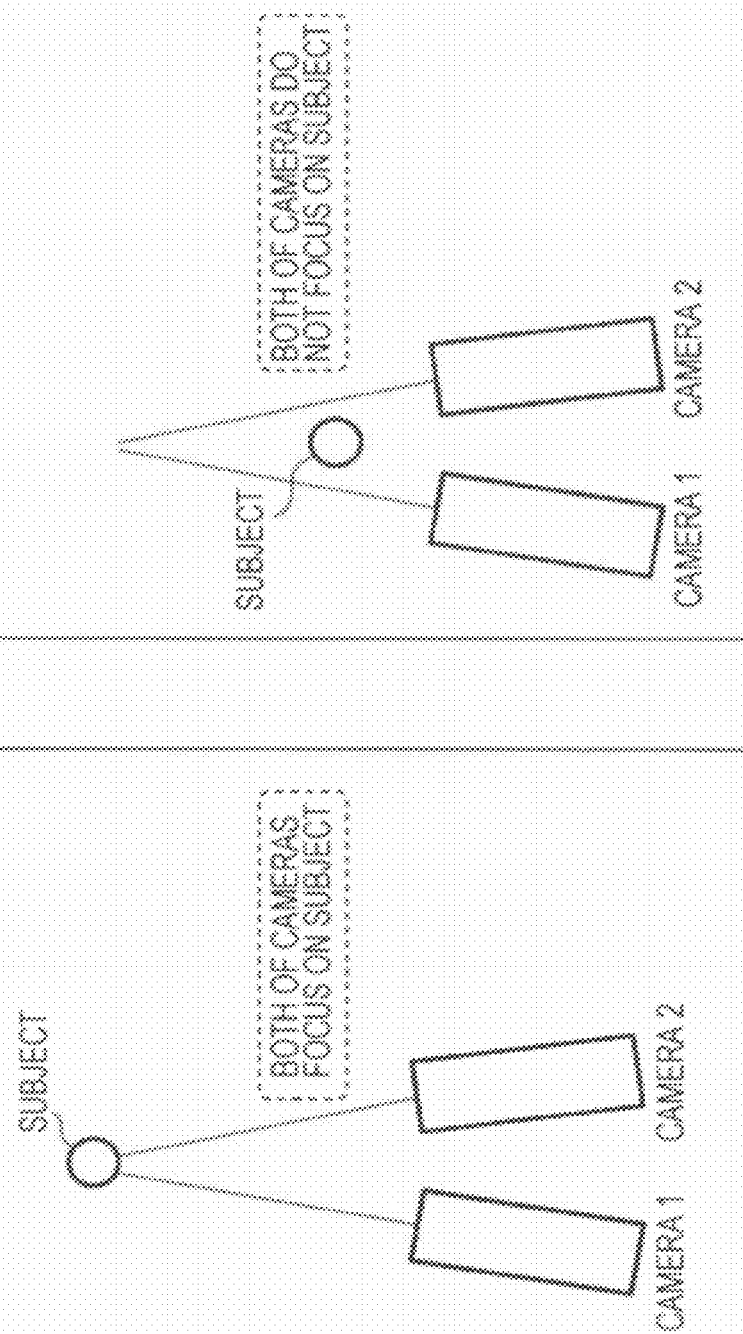

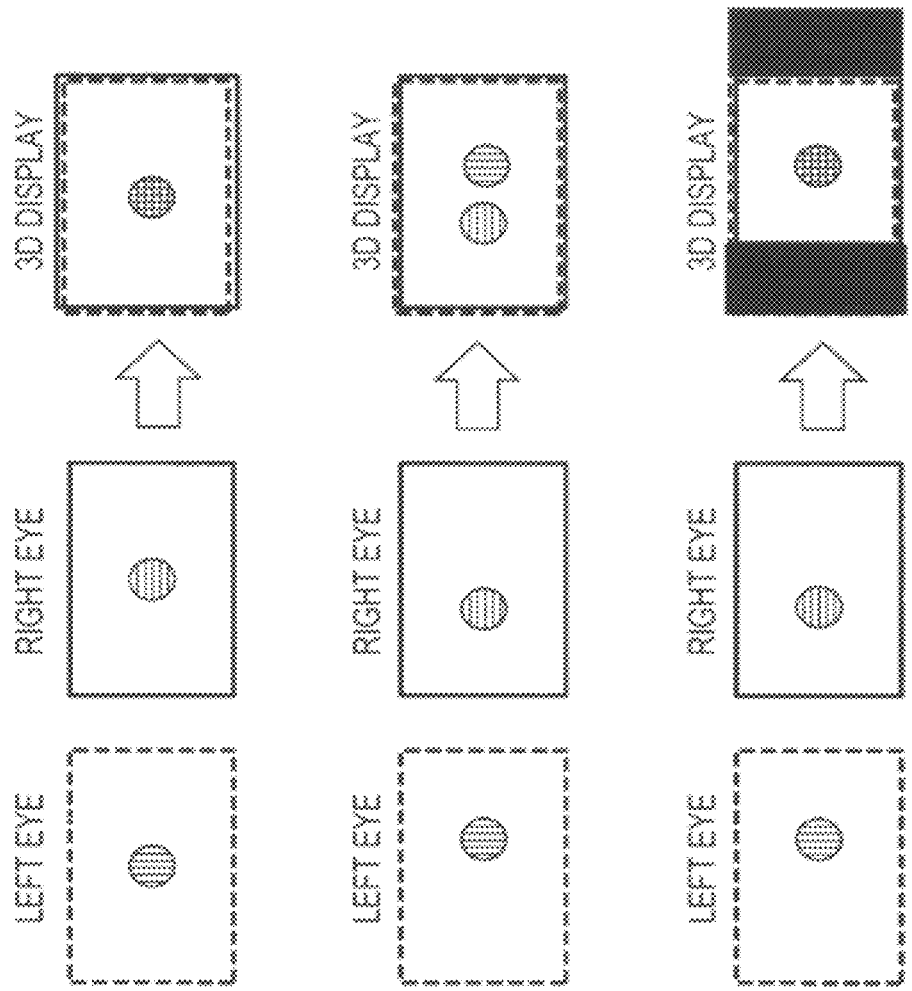

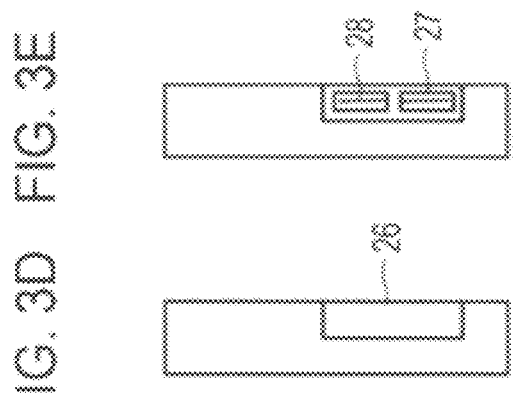
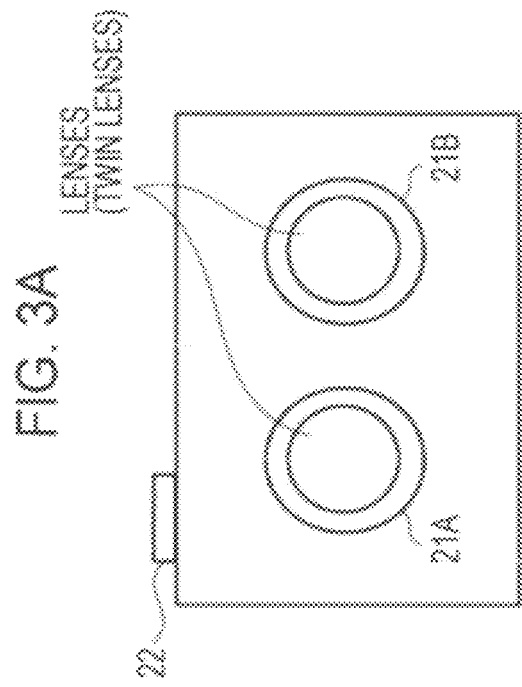
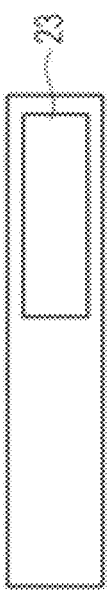

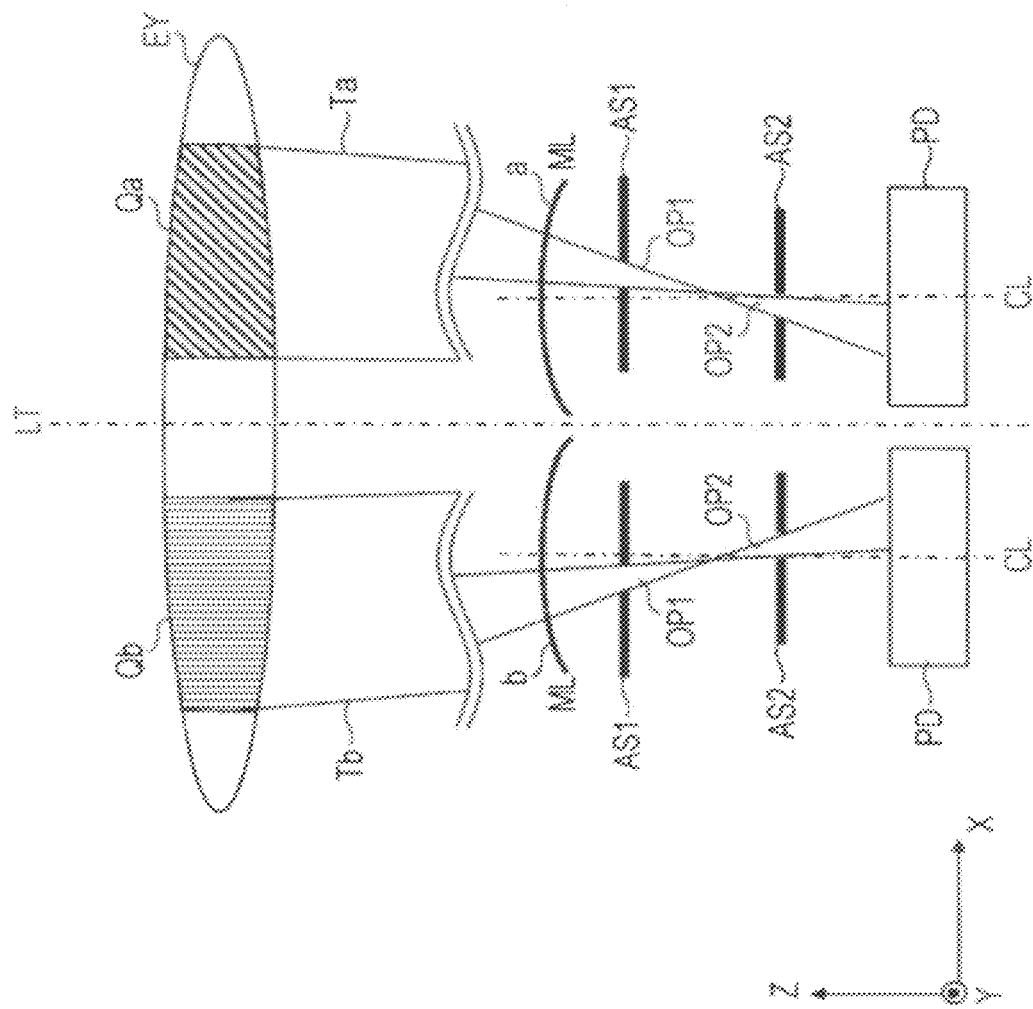

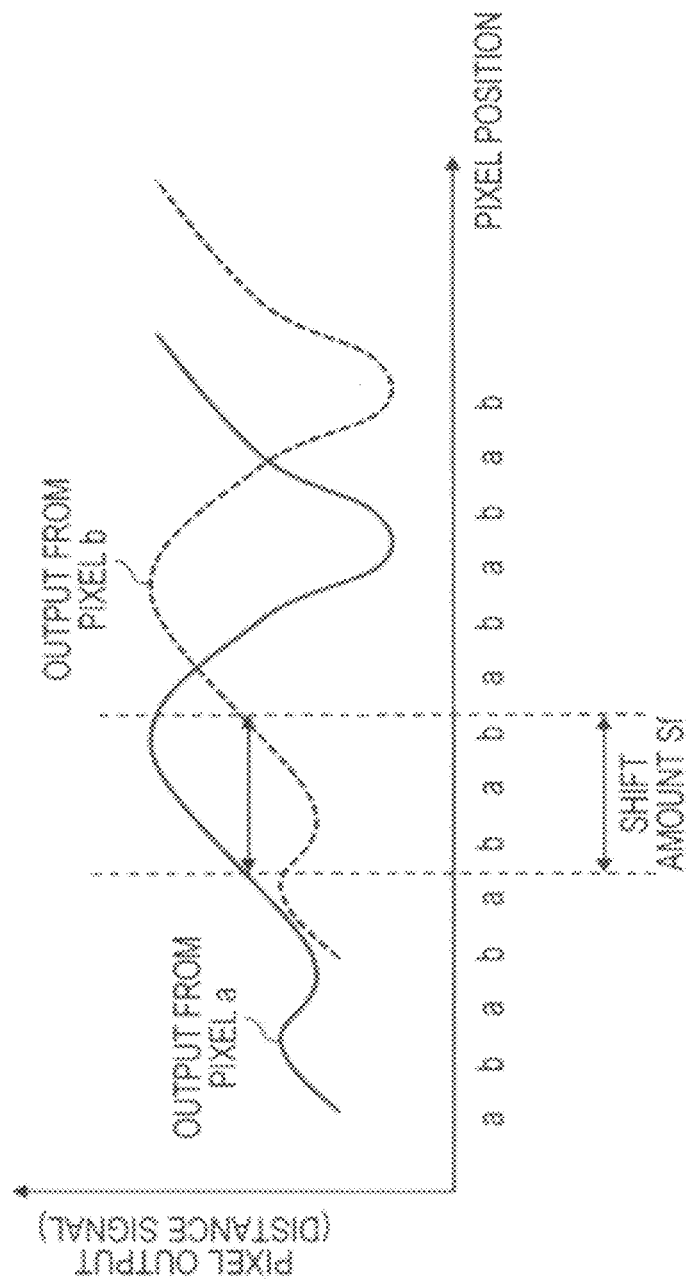

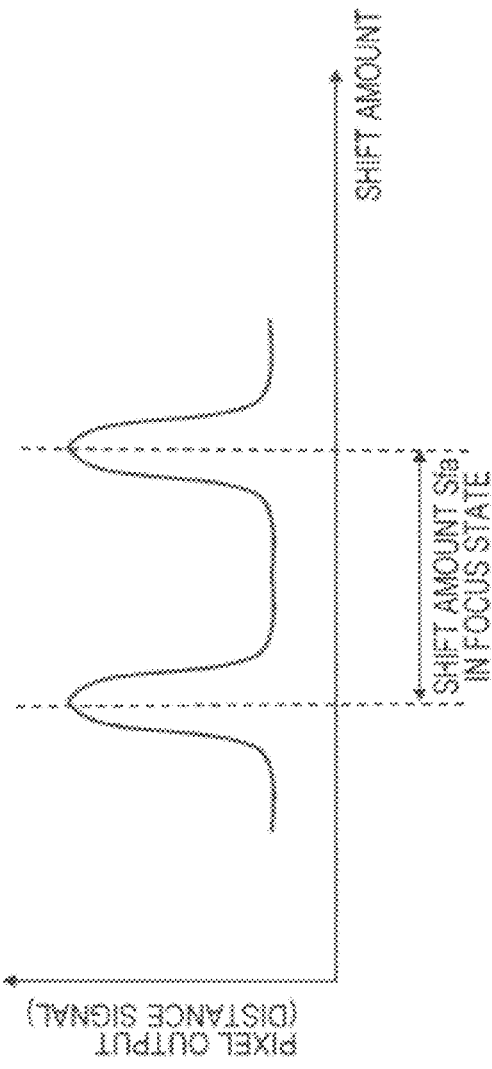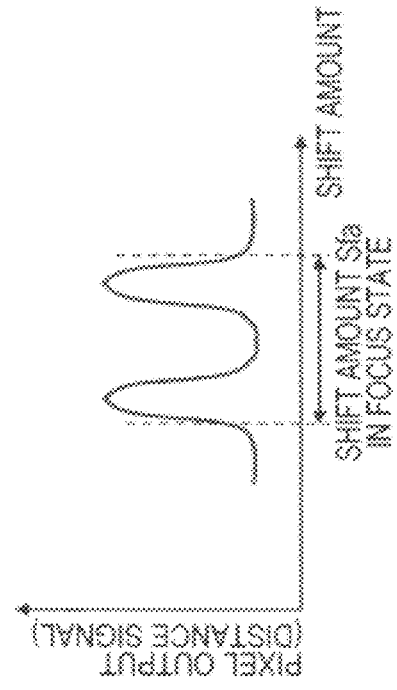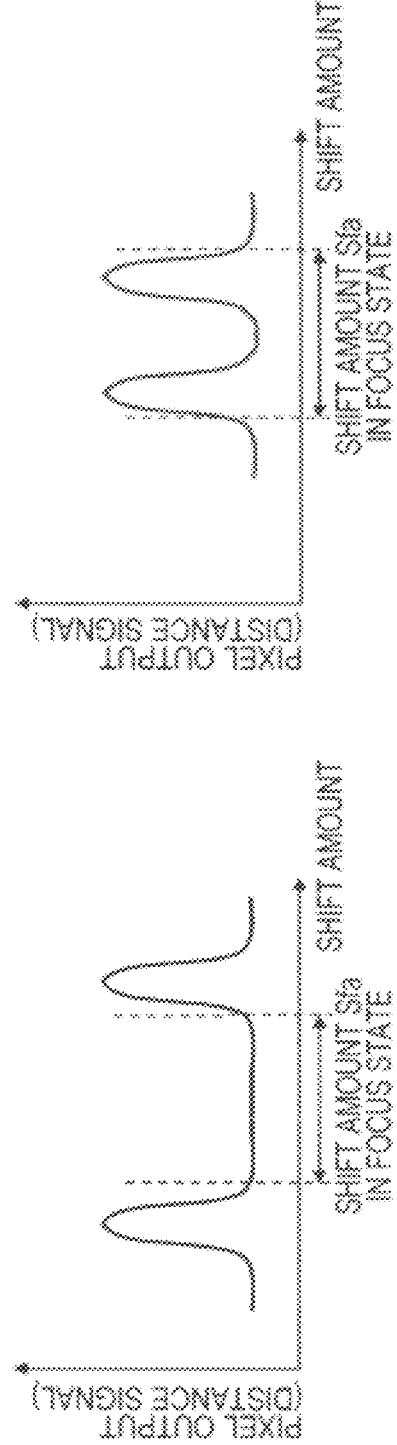

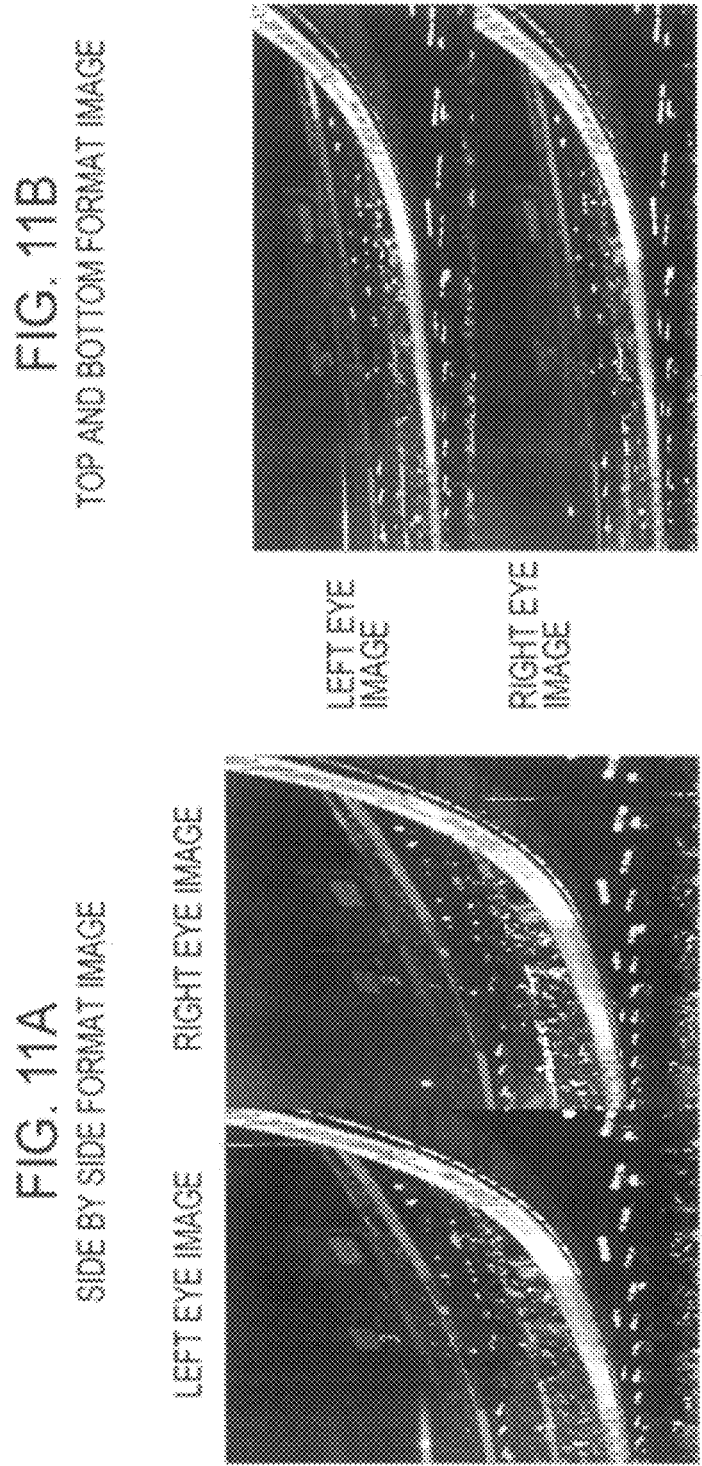

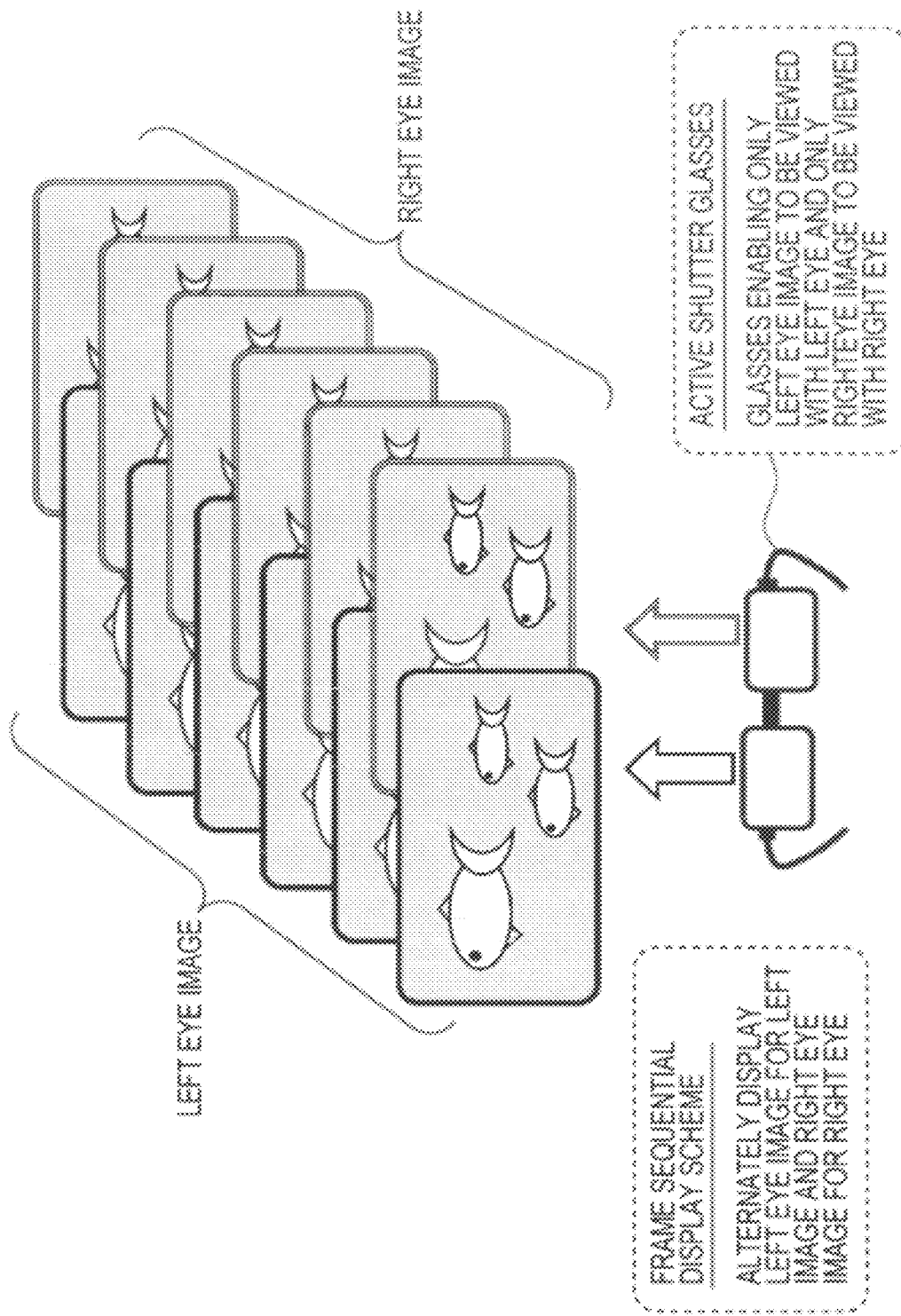

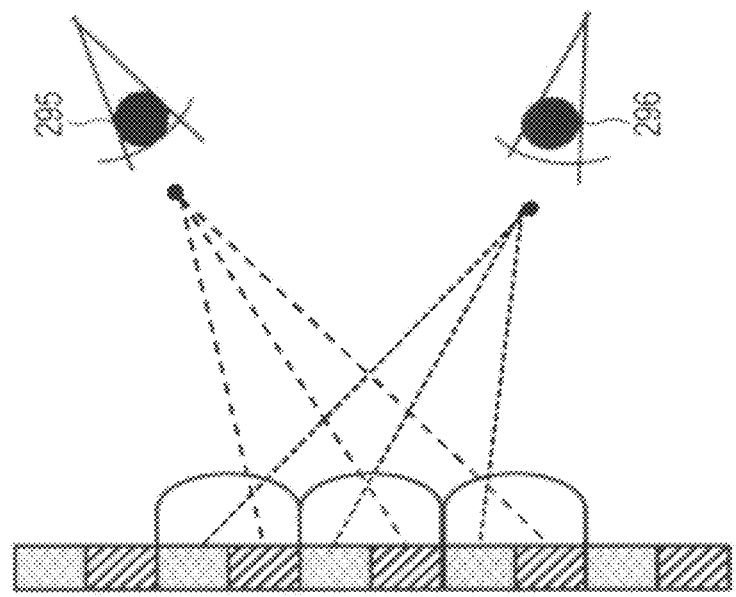
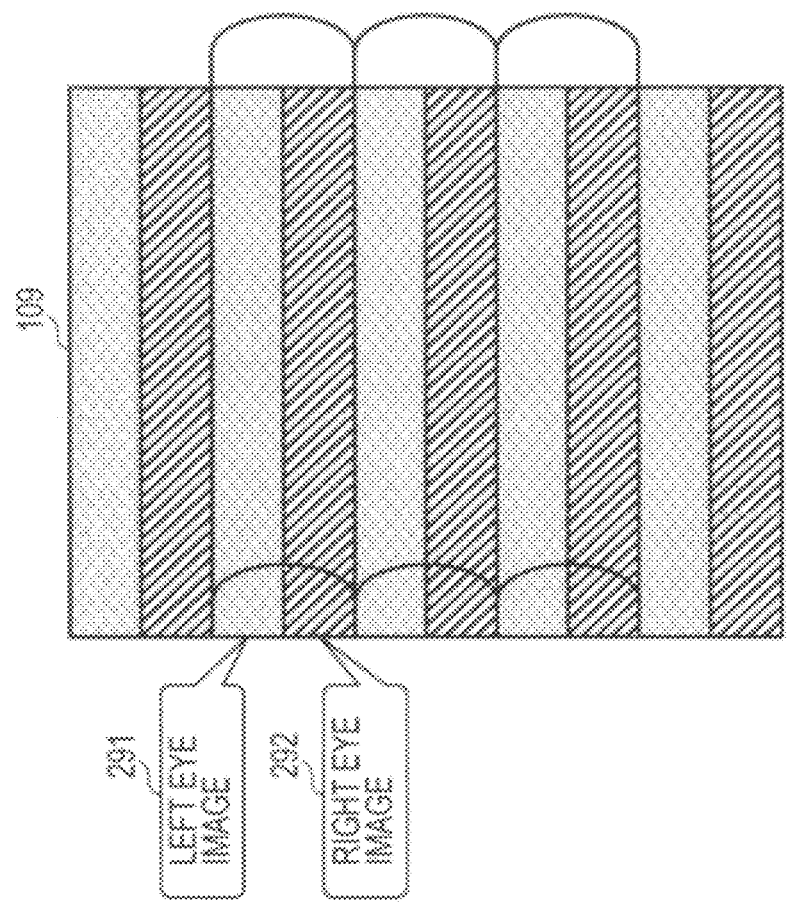
FIG. 13

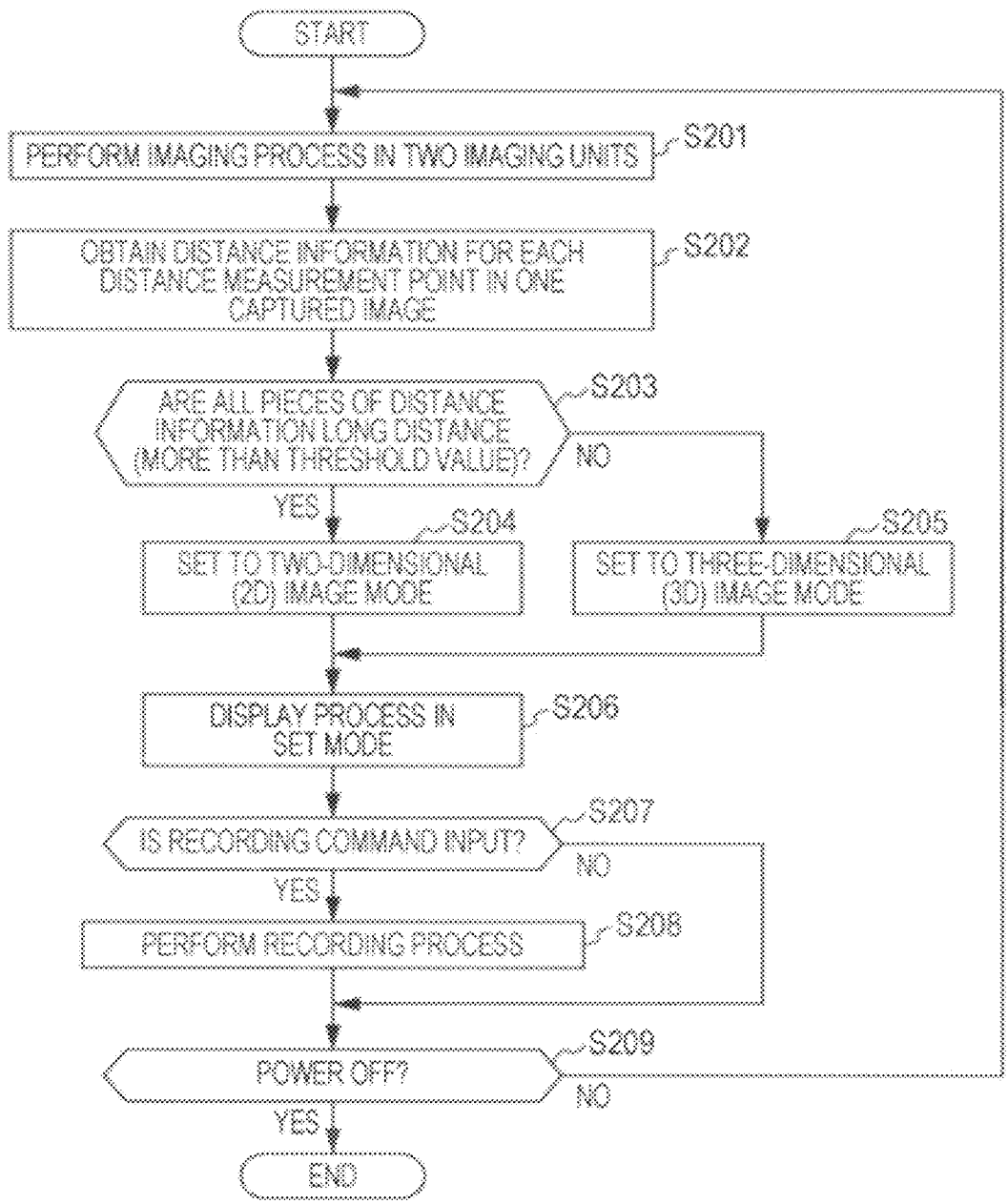

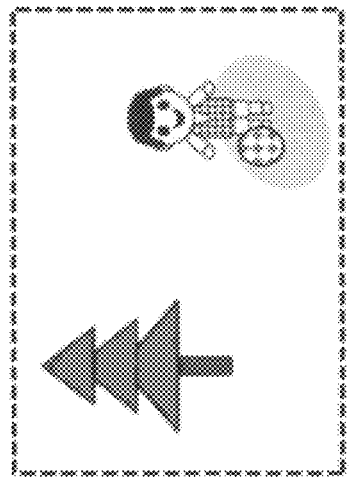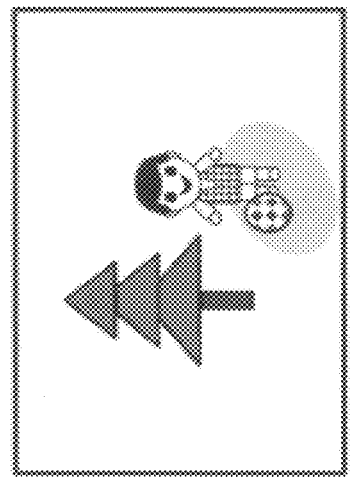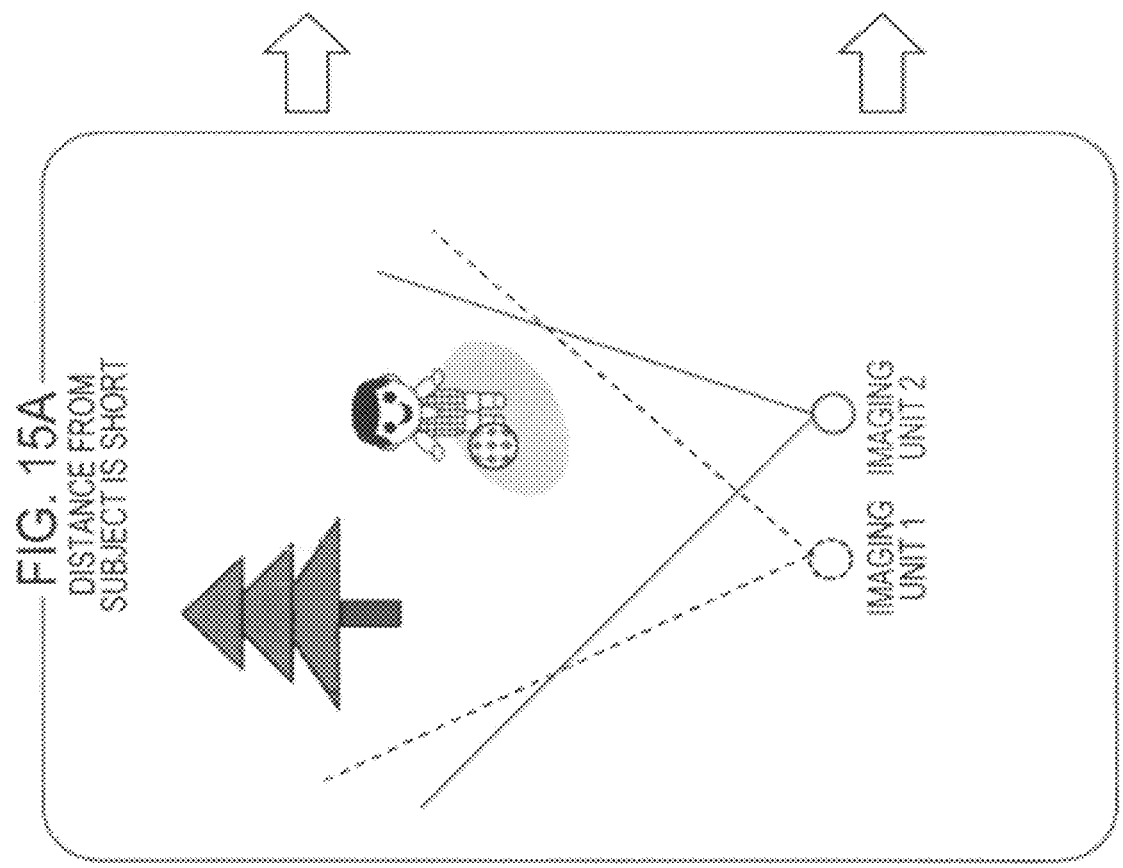

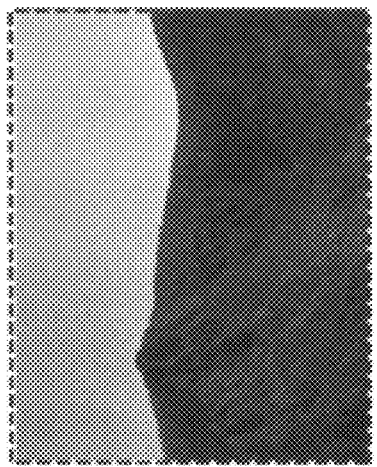
FIG. 16B
IMAGE OBTAINED BY IMAGING UNIT 1
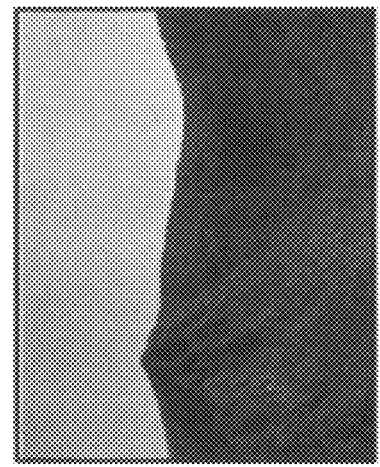
FIG. 16C
IMAGE OBTAINED BY IMAGING UNIT 2
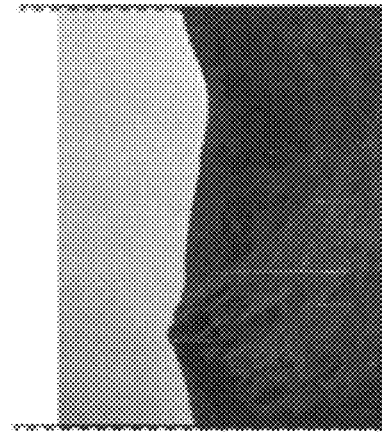
FIG. 16A
DISTANCE FROM SUBJECT IS LONG
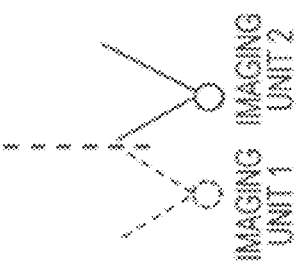
IMAGING UNIT 1    IMAGING UNIT 2

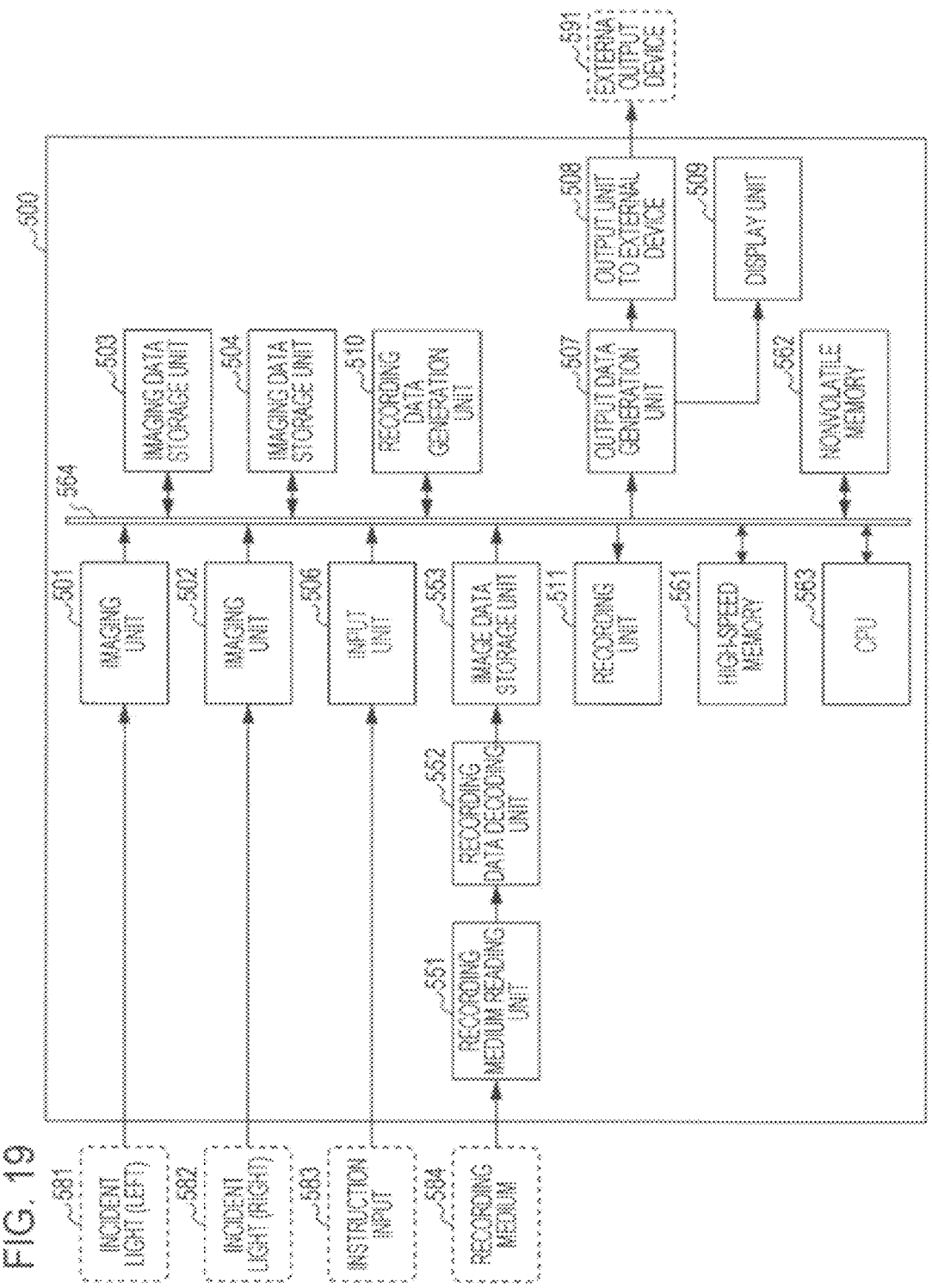

IMAGE PROCESSING DEVICE, IMAGE PROCESSING METHOD, AND PROGRAM

BACKGROUND

The present disclosure relates to an image processing device, an image processing method, and a program. More particularly, the present disclosure relates to an image processing device, an image processing method, and a program, performing recording, outputting or displaying through switching between a three-dimensional image (3D image) and a two-dimensional image (2D image) based on an analysis result of an image.

In recent years, a display device such as a television or a PC capable of displaying a three-dimensional image (3D image), or a video camera, a still camera, and the like capable of recording a three-dimensional image (3D image), have been developed and used. The 3D image is displayed using captured images having different viewpoints, that is, a left eye image and a right eye image. Therefore, when the 3D image is recorded on a medium, it is necessary to record one set of the left eye image and the right eye image, and during a reproduction process, the reproduction is performed using the one set of the left eye image and the right eye image.

A camera, which can capture a 3D image, has lenses which are set at spaced-apart positions and capture a left eye image and a right eye image, and simultaneously captures images having two different viewpoints from the lenses spaced apart from each other. The image capturing is performed using a so-called twin-lens reflex camera. However, in the twin-lens reflex camera, there are several conditions for capturing a favorable 3D image. For example, there is a case where a favorable 3D image may not be captured depending on a position of a subject.

For example, Japanese Patent No. 3186448 and Japanese Unexamined Patent Application Publication No. 2010-161492 disclose as the related art a camera which does not record a 3D image but records a 2D image in a case where a favorable 3D image may not be captured.

Japanese Patent No. 3186448 and Japanese Unexamined Patent Application Publication No. 2010-161492 disclose a configuration in which a photographing mode is switched between a 2D mode for capturing a 2D image and a 3D mode for capturing a 3D image depending on a distance of the subject during the photographing using the twin-lens reflex camera.

A detailed example will be described with reference to FIGS. 1A and 1B. FIGS. 1A and 1B show a positional relationship between the subject and each lens (camera 1 and camera 2) of the twin-lens reflex camera in two cases, a case where the subject is distant from the camera (FIG. 1A) and a case where the subject is close to the camera (FIG. 1B).

As shown in FIG. 1A, when the subject is distant from the camera, both of the lenses (camera 1 and camera 2) can focus on the subject, and thus a 3D image is captured.

However, as shown in FIG. 1B, when the subject is close to the camera, no lenses (camera 1 and camera 2) can focus on the subject, and thus a 2D image is captured.

A conversion process thereof will be described more in detail with reference to FIGS. 2A to 2C.

As shown in FIG. 2A, in a normal case (the subject is spaced apart from the camera by a predetermined distance or more as shown in FIG. 1A), a focal point of the left eye image and a focal point of the right eye image are collected at the same position, and thus a 3D display is possible.

However, in a case where the subject is at a close distance as shown in FIG. 1B, even if the focal points of the images captured by the two imaging units are attempted to be collected as shown in FIG. 2B, the focal points may not be collected, and thus the 3D display is displayed such that two images appear shaky.

In addition, there has been proposed a configuration in which the images as shown in FIG. 2B undergo an image process shown in FIG. 2C and are generated as images which can be displayed in a 3D manner.

The process shown in FIG. 2C is an image process where focal points of the two images are misaligned so as to be collected, and regions in which the two images do not overlap each other do not have image data for the other eye and thus undergo a mask process, that is, are painted in black as regions incapable of performing 3D display.

Hereinbefore, some professionals used the 3D camera for capturing a 3D image in order to obtain particular images aiming at 3D effects due to high price or the size thereof, and thus even a distant subject can be considered only in a range having parallax.

However, presently, low-priced and small-sized 3D cameras are available and thus can be used by general users without burden. For example, there are many cases where a general user takes snapshots or the like as 3D images at travel destinations. However, for example, a landscape picture including only a subject such as a distant hill is an image where the overall subject has little parallax. Even if the subject is photographed and recorded as a 3D image and is displayed as a 3D image using a 3D display device, stereoscopic vision, that is, perspective is hardly recognized. In order to recognize stereoscopic vision by performing 3D display with a display device, it is necessary to include a subject giving sufficient parallax.

In consideration of this fact, the current camera (image capturing device) having a function of capturing a 3D image has the following problems.

PROBLEM 1

In the image capturing device having two imaging units photographing a left eye viewpoint and a right eye viewpoint, at the time of photographing, in a case where all subjects are positioned at a long distance such as a landscape picture, or, for example, if a planar subject such as a painting is photographed, parallax between an image in the left viewpoint and an image in the right viewpoint does not occur or occurs little. For this reason, even if displayed on a 3D display device, images which give little stereoscopic vision are displayed in a manner similar to a 2D image display. On the other hand, the file size of 3D image data is twice that of 2D image data, and thus a storage capacity necessary for a recording unit becomes excessive.

PROBLEM 2

In the image capturing device having two imaging units photographing a left eye viewpoint and a right eye viewpoint, at the time of photographing, in a case where all subjects are at a long distance such as a landscape picture, or, for example, if a planar subject such as a painting is photographed, parallax between an image in the left viewpoint and an image in the right viewpoint does not occur or occurs little. For this reason, even if displayed on a 3D display device, images which little give stereoscopic vision are displayed in a manner similar to a 2D image display. On the other hand, a 3D image is recorded in a recording unit as a 3D file format, and thus may not be displayed on a display device other than a 3D display device or a 3D display supporting output device.

PROBLEM 3

In the image capturing device having two imaging units photographing a left eye viewpoint and a right eye viewpoint, at the time of photographing, in a case where all subjects are at a long distance such as a landscape picture, or, for example, if a planar subject such as a painting is photographed, parallax between an image in the left viewpoint and an image in the right viewpoint does not occur or occurs little. For this reason, for example, in a case where photographing is set while viewing a 3D display device with the naked eye during photographing, there are cases where optimal settings may not be performed since differentiation with an influence of crosstalk on left and right eye images for 3D display is difficult, although differences in various kinds of settings such as exposure or white balance for each imaging unit occur in practice.

SUMMARY

It is desirable to provide an image processing device, an image processing method, and a program, performing recording, outputting or displaying through switching between a three-dimensional image (3D image) and a two-dimensional image (2D image) based on an analysis result of an image.

According to an embodiment of the present disclosure, there is provided an image processing device including a distance data analysis unit that analyzes subject distance information with the partial region units of captured images having different viewpoints; and a data generation unit that determines whether a recorded image or an output image is set to a two-dimensional image or set to a three-dimensional image depending on the analysis result of the distance data analysis unit, and generates the recorded image or the output image based on the determination result, wherein the data generation unit determines a recall level of stereoscopic vision in three-dimensional display based on the analysis result of the distance data analysis unit, and if it is determined that the recall level of stereoscopic vision is low, generates a two-dimensional image as the recorded image or the output image, and if it is determined that the recall level of stereoscopic vision is high, generates a three-dimensional image as the recorded image or the output image.

In addition, the distance data analysis unit may calculate difference data of distance measurement values which are distances to a subject of corresponding coordinate positions of each of an L image and an R image which are images having different viewpoints. At this time, the data generation unit may determine whether or not all pieces or a preset ratio or more pieces of the difference data of the distance measurement values which are distances to a subject of corresponding coordinate positions of each of the L image and the R image, obtained as a result of analysis of the distance data analysis unit, indicate differences smaller than a predefined threshold value, and if it is determined that the difference data indicates differences smaller than the predefined threshold value, it is determined that a recall level of stereoscopic vision in 3D image display is low, generate a 2D image as the recorded image or the output image, and if it is determined that the difference data indicates differences which are not smaller than the predefined threshold value, it is determined that the recall level of stereoscopic vision in 3D image display is high, generate a 3D image as the recorded image or the output image.

Further, the distance data analysis unit may obtain a plurality of pieces of distance data which are measurement values of a plurality of subject distance measurement points set in at least one of an L image and an R image which are images having different viewpoints. At this time, the data generation unit may determine whether or not all pieces or a preset ratio or more pieces of the distance data have distance data equal to or more than a predefined threshold value indicating that a subject distance is long, and if it is determined that the distance data has distance data equal to or more than the predefined threshold value, it is determined that a recall level of stereoscopic vision in 3D image display is low, generate a 2D image as the recorded image or the output image, and if it is determined that the distance data does not have distance data equal to or more than the predefined threshold value, it is determined that the recall level of stereoscopic vision in 3D image display is high, generate a 3D image as the recorded image or the output image.

Furthermore, the image processing device may further include two imaging units that capture images having different viewpoints, and each of the imaging units may include an imaging element which obtains subject distance information with the partial region units of an image.

Here, each of the imaging units may include an imaging element having a pixel region which obtains subject distance information with the partial region units of an image according to a phase difference detection method.

The distance data analysis unit may select a partial image region of an image and analyze subject distance information only for the selected region. In addition, the data generation unit may determine whether a recorded image or an output image is set to a two-dimensional image or set to a three-dimensional image depending on the analysis result of only the selected region, and generate the recorded data or the output data based on the determination result.

Further, the distance data analysis unit may select a focused image region and analyze subject distance information only for the selected region. At this time, the data generation unit may determine whether a recorded image or an output image is set to a two-dimensional image or set to a three-dimensional image depending on the analysis result of only the selected region, and generate the recorded data or the output data based on the determination result.

According to another embodiment of the present disclosure, there is provided an image processing method executed in an image processing device, including causing a distance data analysis unit to analyze subject distance information with the partial region units of captured images having different viewpoints; and causing a data generation unit to determine whether a recorded image or an output image is set to a two-dimensional image or set to a three-dimensional image depending on the analysis result of the distance data analysis unit, and generate the recorded image or the output image based on the determination result, wherein the generating of data includes determining a recall level of stereoscopic vision in three-dimensional display based on the analysis result of the distance data analysis unit, and if it is determined that the recall level of stereoscopic vision is low, generating a two-dimensional image as the recorded image or the output image, and if it is determined that the recall level of stereoscopic vision is high, generating a three-dimensional image as the recorded image or the output image.

According to still another embodiment of the present disclosure, there is provided a program enabling an image process to be executed in an image processing device, including causing a distance data analysis unit to analyze subject distance information with the partial region units of captured images having different viewpoints; and causing a data generation unit to determine whether a recorded image or an output image is set to a two-dimensional image or set to a three-dimensional image depending on the analysis result of the distance data analysis unit, and generate the recorded image or the output image based on the determination result, wherein the generating of data includes determining a recall level of stereoscopic vision in three-dimensional display based on the analysis result of the distance data analysis unit, and if it is determined that the recall level of stereoscopic vision is low, generating a two-dimensional image as the recorded image or the output image, and if it is determined that the recall level of stereoscopic vision is high, generating a three-dimensional image as the recorded image or the output image.

In addition, the program according to the embodiment of the present disclosure is provided to an information processing device or a computer system which can execute various program codes, using, for example, a recording medium. The program is executed by a program execution unit of the information processing device or the computer system and thereby processes according to the program are realized.

Still other objects, features, or advantages of the present disclosure will be apparent through more detailed description based on the embodiments described below or the accompanying drawings. In addition, the system in the present specification refers to a logical assemblage configuration of a plurality of devices, and is not limited to being included in the same casing.

As described above, according to an embodiment of the present disclosure, it is determined whether or not propriety of captured images having different viewpoints as 3D images is determined, and settings of recording or output images are changed based on the determination result. Specifically, subject distances of a left eye image (L image) and a right eye image (R image) are analyzed with the pixel region units, and propriety of the images as 3D images is determined. For example, if all pieces or a preset ratio or more pieces of difference data of distances to a subject of corresponding coordinate positions of each of the L image and the R image are smaller than a predefined threshold value, it is determined that a recall level of stereoscopic vision in 3D image display is low, a 2D image is recorded and output, and if it is determined that the difference data is not smaller than the predefined threshold value, it is determined that the recall level of stereoscopic vision in 3D image display is high, a 3D image is recorded and output.

Through this process, image recording and display processes according to the propriety of the images are realized.

BRIEF DESCRIPTION OF THE DRAWINGS

FIGS. 1A and 1B are diagrams illustrating photographing situations depending on the subject distance in a photographing process in a twin-lens reflex camera.

FIGS. 2A to 2C are diagrams illustrating a generation process of output images based on captured images in the twin-lens reflex camera.

FIGS. 3A to 3E are diagrams illustrating an exterior configuration example of the image capturing device according to an embodiment of the present disclosure.

FIG. 7 is a diagram illustrating an example of the imaging element which can measure a distance through phase difference detection, which is a detailed configuration example of the imaging element of the image capturing device according to the embodiment of the present disclosure.

FIG. 8 is a diagram illustrating a process example in the imaging element which can measure a distance through phase difference detection.

FIGS. 9A to 9C are diagrams illustrating a process example in the imaging element which can measure a distance through phase difference detection.

FIGS. 11A and 11B are diagrams illustrating examples of image data of 3D formats.

FIG. 12 is a diagram illustrating a process example where left eye images and right eye images are alternately output to an external output device such as a 3D television.

FIG. 13 is a diagram illustrating a configuration example of a 3D image display unit having a lenticular lens on a panel.

FIG. 14 is a flowchart illustrating a process sequence performed by an image capturing device according to a second embodiment of the present disclosure.

FIGS. 15A to 15C are diagrams illustrating an example of the image captured by two imaging units when a subject distance is relatively short.

FIGS. 16A to 16C are diagrams illustrating an example of the image captured by two imaging units when a subject distance is relatively long.

FIG. 19 is a hardware configuration example of the image processing device according to the embodiment of the present disclosure.

DETAILED DESCRIPTION OF EMBODIMENTS

Figure 4:
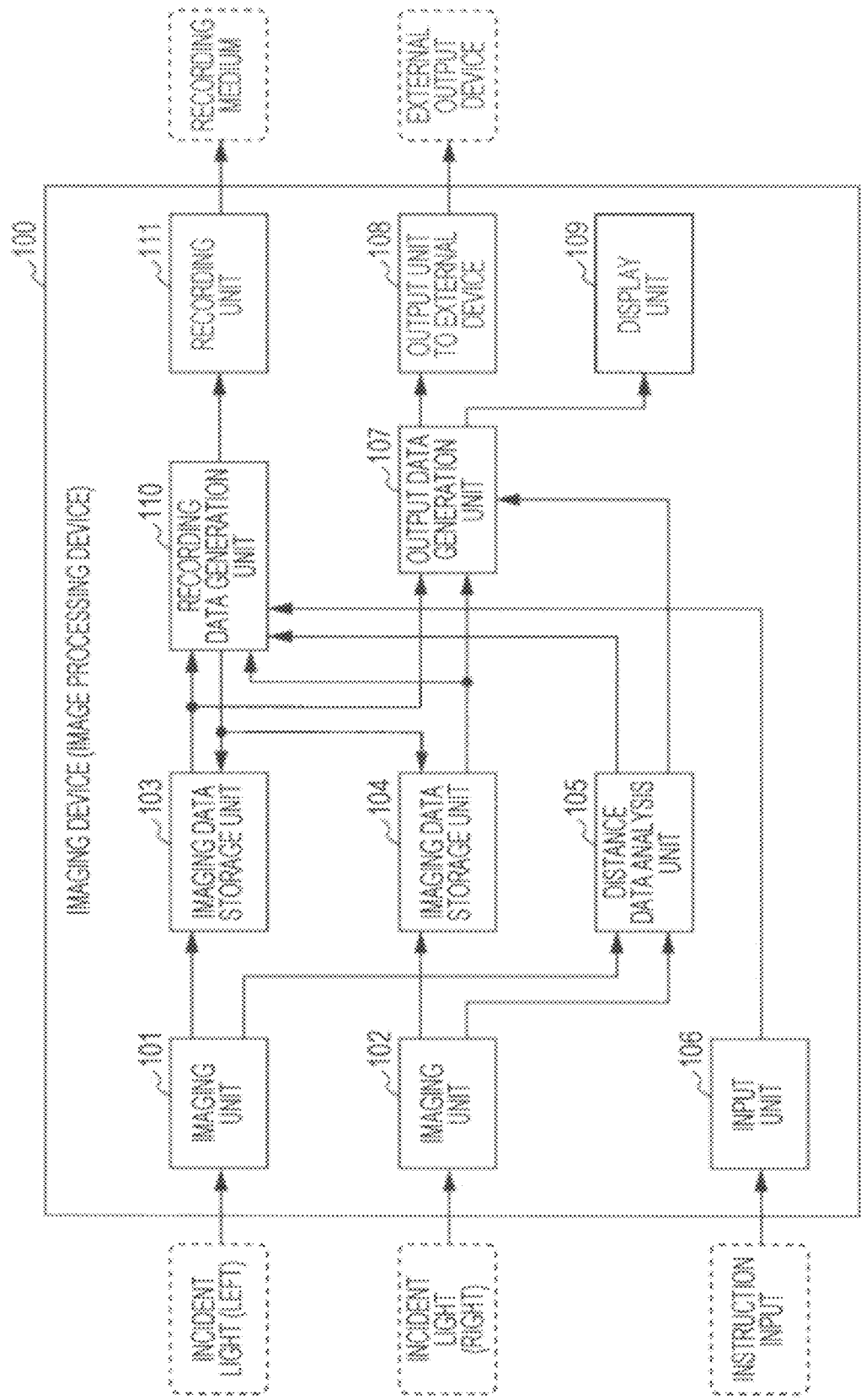
FIG. 4 is a block diagram illustrating functions of the image capturing device according to the embodiment of the present disclosure.

Hereinafter, an image processing device, an image processing method, and a program according to embodiments of the present disclosure will be described in detail with reference to the drawings. The description will be made in the following order.

1. Embodiment Where Mode Switching is Performed Based on Subject Distance Information of Corresponding Points of Left Eye Image (L Image) and Right Eye Image (R Image) (First Embodiment)

2. Process Example Where Two-Dimensional Image is Recorded and Output When Subject Distances are All Long in Captured Image (Second Embodiment)

3. Modified Examples of First and Second Embodiments 3-1. Process Example Where Measurement Information Only for a Portion of Distance Measurement Points is Considered (Third Embodiment)

3-2. Process Example for Recording Data After Photographing (Fourth Embodiment)

4. Configuration Example of Device Performing Processes According to Program (Software)

1. Embodiment Where Mode Switching is Performed Based on Subject Distance Information of Corresponding Points of Left Eye Image (L Image) and Right Eye Image (R Image) (First Embodiment)

First, there will be description of a case where mode switching is performed based on subject distance information of corresponding points of a left eye image (L image) and a right eye image (R image), performed by an image capturing device which is an example of the image processing device according to the first embodiment of the present disclosure.

An exterior configuration example of the image capturing device according to the embodiment of the present disclosure will be described with reference to FIGS. 3A to 3E. The image capturing device 20 includes a plurality of lenses and imaging element used for photographing. FIGS. 3A to 3E show two imaging units 21A and 21B including the lenses and imaging elements. A user presses a shutter button 22, and thereby the two imaging units 21A and 21B can capture two images having parallax.

The captured image may be recorded in a memory card 24, which is present when a lower cover 23 is opened, as an MPO (Multi Picture Format) file format. In addition, there is an installation portion of a battery 25 when the lower cover 23 is opened, and thus driving is possible using a battery, and the user can freely take the image capturing device 20 and perform photographing. In addition, there is a power supply terminal 27 for charging the battery 25 or for supplying power to the device, and an external output terminal 28 when a side cover 26 is opened.

Captured images or images recorded in the memory card 24 can be output from the external output terminal 28. For example, the external output terminal 28 and a 3D video output supporting television (referred to as a 3D supporting television) are connected to each other with an HDMI cable, images are output to the 3D supporting television from the image capturing device, and thus three-dimensional images (3D images) can be displayed on the 3D supporting television. In addition, the image capturing device according to the embodiment of the present disclosure can record and output a three-dimensional image (3D image) and a two-dimensional image (2D image).

In addition, although an example where the pressing of the shutter button 22 is a trigger of photographing will be described in the following embodiments, in a configuration of starting photographing by using voice as a trigger, or in a configuration having a function of recognizing a face, a smiling face, or the like, various photographing start configurations may be used, such as starting photographing based on the recognition process.

In addition, although an example where a captured image is recorded in a memory card 24 in a predetermined file format, that is, the MPO file format, will be described in the following embodiments, left eye images and right eye images may be recorded separately from each other, and may be correlated with each other via file names, or may be recorded in other formats.

Further, the external output terminal 28 is not limited to the HDMI I/F, and may be other various interfaces.

Next, functions and processes of the image capturing device according to the embodiment of the present disclosure will be described with reference to FIGS. 4 and 5.

FIG. 4 is a block diagram illustrating functions of the image capturing device according to the embodiment of the present disclosure.

Figure 5:
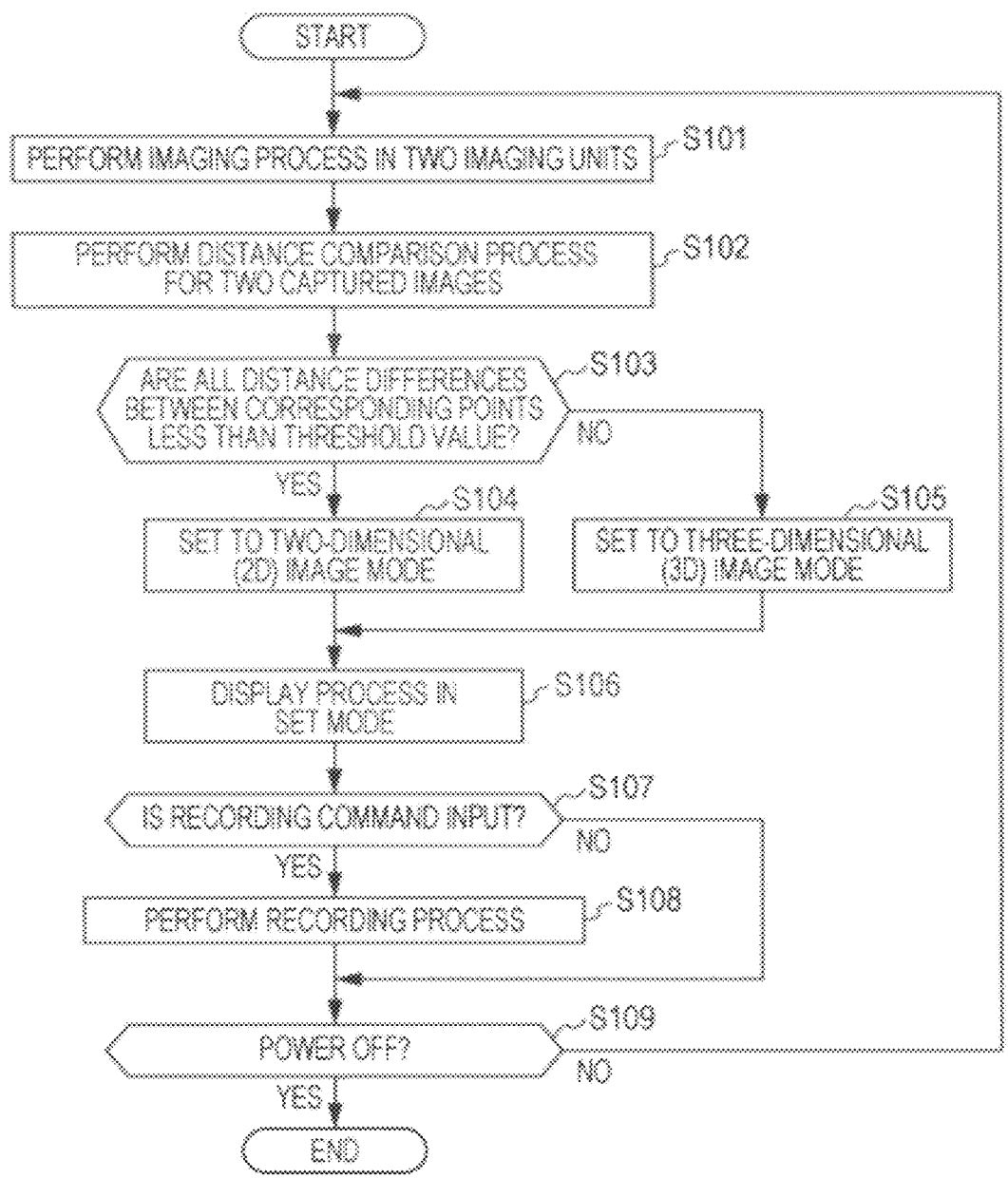
FIG. 5 is a flowchart illustrating processes performed by the image capturing device according to the embodiment of the present disclosure.

FIG. 5 is a flowchart illustrating processes performed by the image capturing device according to the embodiment of the present disclosure.

As shown in FIG. 4, the image capturing device 100 according to the embodiment of the present disclosure includes an imaging unit 101, an imaging unit 102, an imaging data storage unit 103, an imaging data storage unit 104, a distance data analysis unit 105, an input unit 106, an output data generation unit 107, an output unit 108 to an external device (hereinafter, simply referred to as an output unit 108), a display unit 109, a recording data generation unit 110, and a recording unit 111.

In addition, the image capturing device 100 includes a control unit (not shown) which controls processes in the respective constituent units shown in FIG. 4, and a memory storing process programs executed by the control unit.

A variety of processes performed by the image capturing device 100 are performed under the control of the control unit according to the program stored in the memory in advance.

The constituent units of the image capturing device 100 shown in FIG. 4 will be described.

The imaging unit 101 and the imaging unit 102 are imaging units capturing a left eye image (L image) and a right eye image (R image) as a 3D image. That is to say, the imaging unit 101 and the imaging unit 102 are set at spaced-apart positions of the camera photographing a subject from different viewpoints. The imaging unit 101 and the imaging unit 102 correspond to the imaging units 21A and 21B shown in FIGS. 3A to 3E.

The imaging data storage unit 103 and the imaging data storage unit 104 are, for example, frame memories which temporarily store imaging data of the respective imaging units 101 and 102.

The imaging data of the respective imaging units 101 and 102 is input to the imaging data storage unit 103 and the imaging data storage unit 104 and also is input to the distance data analysis unit 105.

The distance data analysis unit 105 compares distances of a subject from the camera, included in the captured images of the respective imaging units 101 and 102, with each other.

The input unit 106 inputs operation information from a user. For example, an instruction such as a recording process command or a deletion process command of imaging data in or from a recording medium is input.

The output data generation unit 107 generates image data such that image data stored in the imaging data storage unit 103 and the imaging data storage unit 104 is output to the display unit 109 or an external output device via the output unit 108.

In addition, the output data generation unit 107 determines whether output image data is a 3D image or a 2D image based on the comparison result of the distance data performed by the distance data analysis unit 105, and generates the output image data according to the determination result.

The output data generation unit 107 determines a recall level (e.g. a perception or envision level) of stereoscopic vision in 3D image display based on the analysis result of the distance data analysis unit 105, and if it is determined that the recall level of stereoscopic vision is low, generates a 2D image as the output image, and if it is determined that the recall level of stereoscopic vision is high, generates a 3D image as the output image.

The output unit 108 is an input and output interface for an external device such as, for example, the HDMI I/F. In addition, the external device is, for example, a display device such as a television which can display a 2D image or a 3D image.

The display unit 109 is, for example, an organic EL. display, or a liquid crystal display. In addition, in the embodiment, the display unit 109 is constituted by, for example, a display device which can display both a 2D image and a 3D image. For example, the display unit 109 is a display device using a lenticular lens. This configuration will be described later.

The recording data generation unit 110 generates data recorded on a recording medium in response to a recording command from the input unit 106.

In addition, the recording data generation unit 110 determines whether data is recorded as a 3D image or a 2D image based on the comparison result of distance data performed by the distance data analysis unit 105, and generates recording data according to the determination result.

The recording data generation unit 110 determines a recall level of stereoscopic vision in 3D image display based on the analysis result of the distance data analysis unit 105, and if it is determined that the recall level of stereoscopic vision is low, generates a 2D image as a recording image, and if it is determined that the recall level of stereoscopic vision is high, generates a 3D image as the recording image.

The recording unit 111 records the recording data generated by the recording data generation unit 110 on a recording medium.

The image capturing device 100 according to the embodiment of the present disclosure is powered on, and the image capturing device 100 starts operations. A sequence of processes performed by the image capturing device 100 shown in FIG. 4 will be described with reference to the flowchart shown in FIG. 5. In addition, as described above, a variety of processes performed by the image capturing device 100 are performed under the control of the control unit according to the program stored in the memory in advance, and the processes shown in FIG. 5 are also performed under the control of the control unit.

STEP S101

An operation starts in step S101 of FIG. 5. In step S101, an imaging process is performed in parallel by the two imaging units 101 and 102 included in the image capturing device 100 in response to, for example, a shutter operation of a user.

For example, an image in the right eye viewpoint and an image in the left eye viewpoint are obtained by the imaging units 21A and 21B disposed at the left and right sides of the camera shown in FIG. 3A. In addition, in the block diagram of FIG. 4, the imaging unit 101 images a subject from the left direction and obtains a left eye image (L image), and the imaging unit 102 images the subject from the right direction and obtains a right eye image (R image).

The imaging unit 101 capturing the left eye image (L image) forms an image of a subject on a built-in imaging element such as a CCD (Charge Coupled Device) image sensor or a CMOS (Complementary Metal Oxide Semiconductor) image sensor, and transmits data for the image accumulated in the imaging element to the imaging data storage unit 103 for each piece of data corresponding to one image.

The imaging unit 101 includes a plurality of photoelectric conversion cells outputting distance measurement signals through phase difference detection on the imaging element, and obtains distance information to a subject, received on the imaging element, with the photoelectric conversion cell units outputting a plurality of distance measurement signals as well as obtaining image data. The measured distance data is transmitted to the distance data analysis unit 105.

With reference to FIGS. 6 to 9C, a detailed configuration example of the imaging element of the imaging unit of the image capturing device according to the embodiment of the present disclosure, that is, an example of the imaging element which can measure a distance through phase difference detection will be described. The imaging element configuration described with reference to FIGS. 6 to 9C is a configuration disclosed in the patent application (Japanese Unexamined Patent Application Publication No. 2009-192605) was filed by the present applicant. The image capturing device according to the embodiment of the present disclosure obtains a subject distance with the pixel units by the use of, for example, the imaging element disclosed in the patent application (Japanese Unexamined Patent Application Publication No. 2009-192605).

Figure 6:
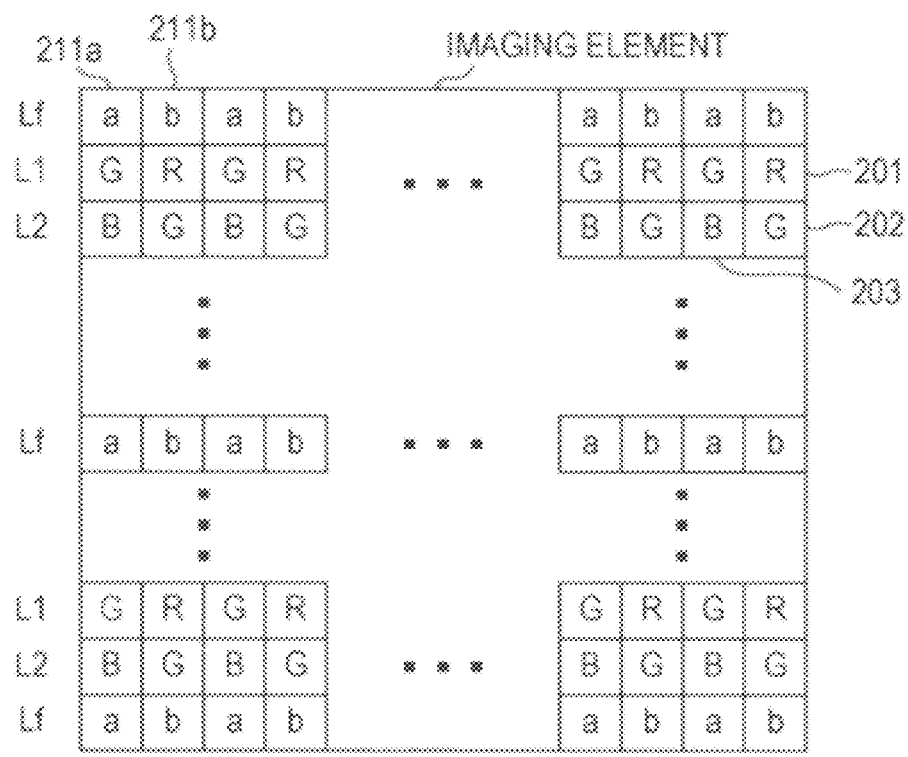
FIG. 6 is a diagram illustrating an example of the imaging element which can measure a distance through phase difference detection, which is a detailed configuration example of the imaging element of the image capturing device according to the embodiment of the present disclosure.

FIG. 6 is a diagram illustrating a configuration of the imaging element of the imaging unit 101. As shown in the figure, the imaging element is provided with normal pixels including R pixels 201, G pixels 202, and B pixels 203 where the respective color filters of R (red), G (green), and B (blue) are disposed on photodiodes, and a and b pixels 211a and 211b which are phase difference detection elements for performing phase difference detection.

A Gr line L1 and a Gb line L2 are formed on the imaging element. In each Gr line L1 serving as a normal pixel horizontal line, the G pixels 202 and the R pixels 201 are alternately disposed horizontally. In each Gb line L2 serving as a normal pixel horizontal line, the B pixels 203 and the G pixels 202 are alternately disposed horizontally. A Bayer arrangement is formed by alternately disposing the Gr lines L1 and the Gb lines L2 vertically. In addition, the imaging element is provided with, for example, phase difference detection lines Lf in which the phase difference detection pixels 211a and 211b are arranged horizontally every six horizontal lines of the normal pixels.

Each of the phase difference detection lines Lf has a plurality of pairs of phase difference detection pixels 211a and 211b which divide the exit pupil of the photographing optical system and senses subject light.

FIG. 7 shows a detailed configuration example of a set of the phase difference detection pixels 211a and 211b.

As shown in FIG. 7, in each of the phase difference lines Lf, the pair of phase difference detection pixels 211a and 211b are disposed horizontally. Each pair of phase difference detection pixels 211a and 211b receives a light beam Ta from a right portion Qa (also referred to as a "right partial pupil region" or simply referred to as a "right pupil region") of the exit pupil EY of the photographing optical system and a light beam Tb from a left portion Qb (referred to as a "left partial pupil region" or simply referred to as a "left pupil region"). Here, in the figure, the +X direction side is referred to as a right side, and the −X direction side is referred to as a left side.

Of the pair of phase difference detection pixels 211a and 211b, the one phase difference detection pixel 211a (also referred to as a "first phase difference detection pixel") includes a micro-lens ML, a first light blocking plate AS1, a second light blocking plate AS2, and a photoelectric conversion portion PD. The micro-lens ML collects incident light at the first phase difference detection pixel 211a, and the first light blocking plate AS1 has a first opening portion OP1 with a slit (rectangular) shape. The second light blocking plate AS2 is disposed under the first light blocking plate AS1 and has a second opening portion OP2 with a slit (rectangular) shape.

The first opening portion OP1 of the first phase difference detection pixel 211a is provided at a position which is disposed towards a specific direction (here, rightward (+X direction)) from a central line CL, which is parallel to the light axis LT and passes through the center of the photoelectric conversion portion PD, as a reference (origin). In addition, the second opening portion OP2 of the first phase difference detection pixel 211a is provided at a position which is disposed towards a direction (also referred to as a "reverse specific direction") which is opposite to the specific direction with respect to the central axis CL as a reference.

Of the pair of phase difference detection pixels 211a and 211b, the other phase difference detection pixel 211b (also referred to as a "second phase difference detection pixel") includes a micro-lens ML, a first light blocking plate AS1, a second light blocking plate AS2, and a photoelectric conversion portion PD. The micro-lens ML collects incident light at the first phase difference detection pixel 211a, and the first light blocking plate AS1 has a first opening portion OP1 with a slit (rectangular) shape. The second light blocking plate AS2 is disposed under the first light blocking plate AS1 and has a second opening portion OP2 with a slit (rectangular) shape. The first opening portion OP1 of the second phase difference detection pixel 211b is provided at a position which is disposed towards a direction which is opposite to the specific direction with respect to the central axis CL as a reference. In addition, the second opening portion OP2 of the second phase difference detection pixel 211b is provided at a position which is disposed towards the specific direction with respect to the central line CL as a reference.

That is to say, in the pair of phase difference detection pixels 211a and 211b, the first opening portions OP1 are provided so as to be disposed in opposite directions. In addition, the second opening portions OP2 are disposed so as to be displaced in different directions with respect to the corresponding first opening portions OP1 in the phase difference detection pixels 211a and 211b.

In the pair of phase difference detection pixels 211a and 211b having the above-described configuration, distance measurement signals of subject light transmitted through the different regions (portions) of the exit pupil EY are obtained.

Specifically, the light beam Ta transmitted through the right pupil region Qa of the exit pupil EY passes through the micro-lens ML and the first opening portion OP1 of the first light blocking plate AS1, corresponding to the first phase difference detection pixel 211a, is restricted (limited) by the second light blocking plate AS2, and then is sensed by the photoelectric conversion portion PD of the first phase difference detection pixel 211a. The output from the photoelectric conversion portion is obtained as a distance measurement signal a regarding the light beam Ta of the right pupil region Qa.

In addition, the light beam Tb transmitted through the left pupil region Qb of the exit pupil EY passes through the micro-lens ML and the first opening portion OP1 of the second light blocking plate AS2, corresponding to the second phase difference detection pixel 211b, is restricted by the second light blocking plate AS2, and then is sensed by the photoelectric conversion portion PD of the second phase difference detection pixel 211b. The output from the photoelectric conversion portion is obtained as a distance measurement signal b regarding the light beam Tb of the left pupil region Qb.

FIG. 8 shows outputs (distance measurement signals) of the photoelectric conversion portions obtained by the pixels a, b, a, b, . . . of the one phase difference detection line Lf shown in FIG. 6. As shown in FIG. 8, the output line from the pixels a and the output line from the pixels b are signals having a predetermined amount of a shift amount Sf.

FIG. 9A shows a shift amount Sfa generated between the pixels a and b when a focus lens is set to a position corresponding to a subject distance and is focused, that is, in a focused state.

FIGS. 9B and 9C show a shift amount Sfa generated between the pixels a and b when the focus lens is not set to the position corresponding to the subject distance and is not focused, that is, in a defocused state.

FIG. 9B shows a case where the shift amount is greater than that in the focused state, and FIG. 9C shows a case where the shift amount is smaller than that in the focused state.

In the cases shown in FIGS. 9B and 9C, the focus lens can be focused by being moved so as to have the shift amount in the focused state.

This process is a focusing process according to a "phase difference detection method".

The focus lens can be set to a focal position by the focusing process according to the "phase difference detection method", and the focus lens can be set to a position corresponding to a subject distance.

The shift amount described referring to FIGS. 9A to 9C can be measured with the set units of the pixels a and b which are all phase difference detection elements in FIG. 6, a focal point for an image captured in this fine region (a combination region of the pixels a and b) can be determined separately, and, as a result, it is possible to calculate a distance corresponding to a focus position according to a subject distance corresponding to the fine region (a combination region of the pixels a and b).

In the imaging units 101 and 102 of the image capturing device according to the embodiment of the present disclosure shown in FIG. 4 a subject distance with the fine region units of an image is calculated by applying a focusing technique according to the "phase difference detection method", and outputs the distance information to the distance data analysis unit 105. In addition, when each pair unit of the pixels a and b calculates a distance, a calculation process may be performed based on a shift amount, or correspondence data between a shift amount and a subject distance may be measured in advance and stored in the memory of the imaging unit, and then a distance value may be obtained by applying input data.

In addition, if a focal length of the photographing lens is f, a pitch size which is a base length of the first phase difference detection pixel 211a and the second phase difference detection pixel 211b is L, and a shift amount obtained by the phase difference detection is n, a distance R to a subject can be calculated using the equation R=f×L/n according to the triangulation principle.

A distance to a subject may be calculated using the above equation.

In addition, a distance measurement method according to the embodiment of the present disclosure is not necessarily limited to the "phase difference detection method", but may be any configuration as long as a distance measurement signal can be obtained along with an image signal with the configuration.

In addition, the distance measurement data may be used in applications using a distance measurement value by recording still images or moving images together in addition to the automatic focusing process.

In the same manner as the imaging unit 101, the imaging unit 102 forms an image on a built-in imaging element such as a CCD (Charge Coupled Device) image sensor or a CMOS (Complementary Metal Oxide Semiconductor) image sensor, and transmits data for the image accumulated in the imaging element to the imaging data storage unit 104 for each piece of data corresponding to one image. In addition, in the same manner as the imaging unit 101, the imaging unit 102 includes a plurality of photoelectric conversion cells outputting distance measurement signals through phase difference detection on the imaging element, and obtains distance information to a subject as well as obtaining image data. The measured distance data is transmitted to the distance data analysis unit 105.

The imaging data storage unit 103 includes a semiconductor memory or the like, and can temporarily store several frames of imaging data from the imaging unit 101. The stored imaging data from the imaging unit 101 is transmitted to the output data generation unit 107. In addition, when a recording data output command is issued from the recording data generation unit 110, the imaging data of one frame obtained at the timing when the command is issued is transmitted to the recording data generation unit 110.

The imaging data storage unit 104 has the same configuration as the imaging data storage unit 103, and can temporarily store several frames of imaging data from the imaging unit 102. The stored imaging data from the imaging unit 102 is transmitted to the output data generation unit 107. In addition, when a recording data output command is issued from the recording data generation unit 110, the imaging data of one frame obtained at the timing when the command is issued is transmitted to the recording data generation unit 110.

If storage of the imaging data of the respective imaging units in the imaging data storage units 103 and 104 is completed, the flow goes to step S102.

STEP S102

In step S102, distances are compared with each other.

The distance data analysis unit 105 performs comparison based on the distance measurement data obtained from the imaging units 101 and 102. Specifically, the comparison is performed between corresponding coordinate positions of a left eye image (L image) and a right eye image (R image).

Figure 10B:
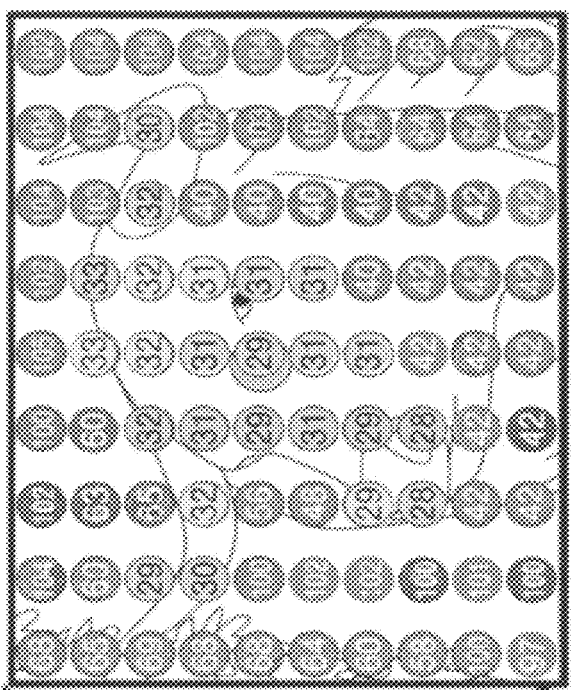
FIGS. 10A and 10B are diagrams illustrating an example of distance measurement data corresponding to a captured image.
Figure 10A:
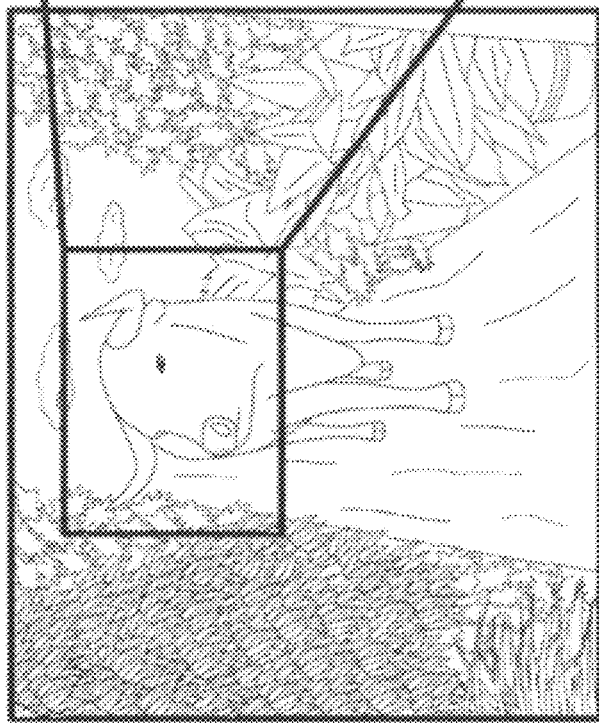

FIGS. 10A and 10B show an image of distance measurement data obtained from either the imaging unit 101 or the imaging unit 102. FIG. 10A shows imaging data obtained by the imaging unit 101 or the imaging unit 102, and FIG. 10B is a partially enlarged view thereof. Each of the imaging unit 101 and the imaging unit 102 is provided with the imaging element including the phase difference detection elements as shown in FIG. 6, and can obtain distance measurement values of the respective phase difference detection pixel portions by a plurality of phase difference detection pixels formed on the imaging element as shown in FIG. 10B. In this example, the distance measurement value is obtained as data of 7 bits (0 to 127), and is as great as a subject is distant.

STEPS S103 TO S105

In step S103, the distance data analysis unit 105 compares the distance measurement values of the phase difference detection pixels in all the corresponding coordinate positions with regard to the distance measurement data obtained from the imaging unit 101 and the imaging unit 102, and determines whether or not a distance difference between corresponding points of the L image and the R image is smaller than a preset threshold value.

If the distance measurement data of the compared corresponding points is the same, or the display result includes all corresponding pixels within an error range (for example, within an error ±5 in the distance measurement value of 7 bits (0 to 127)) which can be regarded to be equivalent to the human eye, a determination result is affirmative (Yes) in step S103, and the flow goes to step S104. Otherwise, the determination result is negative (No) in step S103, and the flow goes to step S105.

If the same subject is photographed at the same coordinate positions of the left eye image (L image) and the right eye image (R image), distance measurement data of the corresponding points of the LR images are almost the same.

However, if different subjects are photographed at the same position of the left eye image (L image) and the right eye image (R image), distance measurement data of the corresponding points of the LR images are not the same.

If different subjects are photographed at the same position of the left eye image (L image) and the right eye image (R image), it means that images including subjects having different distances are captured as an L image and an R image, and stereoscopic vision can be grasped in a case where the images are displayed as 3D images.

For example, in an image where only distant mountains are captured, subject distance information at all the corresponding coordinate positions of a left eye image (L image) and a right eye image (R image) is the same (for example, infinity). In the same manner, in a case where a plane such as a painting hanging on a wall is imaged as well, subject distance information at all the corresponding coordinate positions of a left eye image (L image) and a right eye image (R image) is the same.

In this case, a determination result is affirmative (Yes) in step S103, and the flow goes to step S104. In step S104, the image capturing device 100 is set to a 2D image mode.

On the other hand, if a figure who is positioned at a distance of several meters from the camera is captured as a background of distant mountains, in a left eye image (L image) and a right eye image (R image), one of portions of corresponding coordinates forms an image of the figure, and the other thereof forms an image of the mountains. In this case, distance data for the corresponding coordinate positions of the left eye image (L image) and the right eye image (R image) is greatly different, and thus a distance difference equal to or more than the threshold value occurs. As a result, a determination result is negative (No) in step S103, and the flow goes to step S105. In step S105, the image capturing device 100 is set to a 3D image mode.

In addition, although a determination process of whether a distance difference is smaller than the threshold value for all pieces of the distance measurement data is performed in the embodiment, there may be a setting of a determination process of whether or not, for example, a portion having a large number of measurement points as the corresponding points, for example, points equal to or more than 95% have a distance difference smaller than a predetermined threshold value, in consideration of errors in the distance measurement.

In this setting, if 95% or more points of the distance measurement data of the corresponding coordinate points in the respective LR images have a distance difference, a determination result is affirmative (Yes) in step S103, and, if otherwise, a determination result is negative (No).

If the distance measurement data of the compared corresponding points between the LR images is the same, or the display result includes all corresponding pixels within an error range (for example, within an error ±5 in the distance measurement value of 7 bits (0 to 127)) which can be regarded to be equivalent to the human eye in step S103, the flow goes to step S104 and, in step S104, the image capturing device 100 is set to a 2D mode in which a 2D image is recorded and output. If the respective units included in the image capturing device 100 are switched to the 2D mode, the flow goes to step S106.

On the other hand, if it is determined that the distance measurement data of the compared corresponding points between the LR images is not the same, or corresponding pixels are not included within an error range (for example, within an error ±5 in the distance measurement value of 7 bits (0 to 127)) which can be regarded to be equivalent to the human eye in step S103, the flow goes to step S104, and, in step S104, the image capturing device 100 is set to a 3D mode in which a 3D image is recorded and output. If the respective units included in the image capturing device 100 are switched to the 3D mode, the flow goes to step S106.

STEP S106

In step S106, an image display process corresponding to the set mode (the 2D mode or the 3D mode) of the image capturing device is performed.

If the determination result is affirmative (Yes) in step S103, and the 2D mode is set in step S104, the output data generation unit 107 performs the following processes.

In a case where a mode of the image capturing device 100 is set to the 2D mode in which a 2D image is captured and recorded, the output data generation unit 107 selects image data stored in one of the imaging data storage unit 103 and the imaging data storage unit 104 as an output image.

In addition, when the 2D mode is set, as a method of selecting an output image, image data of the imaging data storage unit 103 or image data of the imaging data storage unit 104 may be set in advance so as to be output, or a user may select the output image. For example, if the imaging data storage unit 103 is selected, an image captured by the imaging unit 21B shown in FIG. 3A is obtained, and if the imaging data storage unit 104 is selected, an image captured by the imaging unit 21A in FIG. 3A is obtained. The obtained image data is transmitted to the output unit 108 and the display unit 109.

On the other hand, if a determination result is negative (No) in step S103, and the 3D mode is set in step S105, the output data generation unit 107 performs the following processes.

In a case where a mode of the image capturing device 100 is set to the 3D mode in which a 3D image is captured and recorded, the output data generation unit 107 inputs image data stored in the imaging data storage unit 103 and image data stored in the imaging data storage unit 104, that is, two pieces of image data (an L image and an R image) having different left and right viewpoints, and generates image data of a 3D format as an output image from the image data.

The 3D format of image data includes, for example, a side by side format where the left eye image (L image) and the right eye image (R image) are disposed at the left and right division regions of one frame image as shown in FIG. 11A, and a top and bottom format where the left eye image (L image) and the right eye image (R image) are disposed at the top and bottom division regions of one frame image as shown in FIG. 11B. The output data generation unit 107 converts a format of the image data into the output format of 3D images such as, for example, the formats in FIGS. 11A and 11B, and outputs the image data to the output unit 108 or the display unit 109.

The output unit 108 transmits the input data from the output data generation unit 107 to an output device such as a television. The output unit 108 converts the input data from the output data generation unit 107 into data of a format which can be displayed by an external output device such as, for example, a television, and outputs the input data to the external output device.

Specifically, the output unit 108 performs signal processes for creating various images such as gamma correction on the data received from the output data generation unit 107, and converts a resolution of the image so as to be suitable for an output destination. For example, a resolution is converted into 720×480 pixels in a case of an SD television, and is converted into 1920×1080 pixels in a case of an HD television. In addition, the output unit 108 converts the image so as to have an I/F format of an external output device such as an HDMI and outputs the image.

Through the output process, the external output device can perform image reproduction display corresponding to the mode of the image capturing device 100. That is to say, in a case where a mode of the image capturing device 100 is set to the 2D mode, it is possible to view 2D image data generated based on either the L image or the R image generated by the output data generation unit 107.

In addition, in a case where a mode of the image capturing device 100 is set to the 3D mode, for example, as shown in FIG. 12, left eye images and right eye images are alternately output to an external output device such as a 3D television. 3D images can be viewed through a setting where the left eye image (L image) is seen only with the left eye and the right eye image (R image) is seen only with the right eye by alternately opening and closing left and right lenses of active shutter glasses belonging to the external output device.

The display unit 109 includes, for example, an organic EL display or a liquid crystal display, and performs signal processes for creating various images such as gamma correction on the data received from the output data generation unit 107, and converts a resolution of the image so as to be suitable for an output destination. For example, the display unit 109 converts a resolution into 640×480 in a case of a resolution of the liquid crystal display used as the display unit 109 is VGA. A user can determine framing by displaying the image on the built-in display device of the image capturing device 100.

The display unit 109 has a configuration in which both of a 2D image and a 3D image can be displayed. With this configuration, image reproduction display corresponding to the set mode of the image capturing device 100 can be performed. In other words, in a case where a mode of the image capturing device 100 is set to the 2D mode, it is possible to view 2D image data generated based on either the L image or the R image generated by the output data generation unit 107.

On the other hand, in a case where a mode of the image capturing device 100 is set to the 3D mode, 3D images can be viewed through a setting where the left eye image (L image) is seen only with the left eye and the right eye image (R image) is seen only with the right eye.

In addition, the display unit 109 preferably has a configuration in which 3D images can be observed with the naked eye. For example, the configuration is implemented by providing a lenticular lens on a panel as shown in FIG. 12.

FIG. 13 shows an example of the display unit 109. The lenticular lens is formed on the surface of the display unit 109 as shown in FIG. 13. The left eye image (L image) 291 and the right eye image (R image) 292 are alternately output like a strip of paper. Through the output, the left eye image (L image) 291 can be seen only with the left eye 296, and the right eye image (R image) 292 can be seen only with the right eye 295, and thereby 3D images can be viewed.

STEPS S107 AND S108

If the display process in the set mode in step S106 is completed, the flow goes to step S107.

In step S107, it is determined whether or not a recording command is received via the input unit 106.

If the input unit 106 receives an instruction input from a user, and the control unit analyzes the instruction contents and recognizes that a recording command is issued, the control unit issues the recording command to the recording data generation unit 110. If the recording command is issued, the flow goes to step S108. If the recording command is not issued, the flow goes to step S109.

In step S108, the captured images are recorded on a recording medium.

In a case where a mode of the image capturing device 100 is set to the 2D mode in which a 2D image is recorded and displayed, the recording data generation unit 110 selects the image data stored in one of the imaging data storage unit 103 and the imaging data storage unit 104 at the timing when the recording command from the input unit 106 is issued, as recording data.

The selection process of the recording data may be performed through a pre-setting where any one of the image data of the imaging data storage unit 103 or the image data of the imaging data storage unit 104 is recorded by the device at all times, or a setting selected by a user. The control unit issues a recording data output command to the imaging data storage unit storing an image selected as recording data, and obtains the recording data.

For example, if the imaging data storage unit 103 is selected, an image captured by the imaging unit 21B in FIG. 3A is obtained as data recorded on a recording medium. On the other hand, if the imaging data storage unit 104 is selected, an image captured by the imaging unit 21A in FIG. 3A is obtained as data recorded on a recording medium. The recording data generation unit 110 converts a format of the obtained image data into an image compression format such as a JPEG format, and transmits the image data to the recording unit 111.

In addition, in a case where a mode of the image capturing device 100 is set to the 3D mode in which a 3D image is recorded and displayed, the recording data generation unit 110 issues a recording data output command to both of the imaging data storage unit 103 and the imaging data storage unit 104. The recording data generation unit 110 obtains both of the image data stored in the imaging data storage unit 103 and the image data stored in the imaging data storage unit 104, and converts a format of each piece of the image data into an image compression format such as a JPEG format.

In addition, the recording data generation unit 110 converts a format of the image data into a format for recording a plurality of files as one file. For example, the format is a multi picture format (MPO), defined by CIPA, or the like for recording a plurality of JPEG images as one file. The obtained data is transmitted to the recording unit 111.

In addition, the format of data recorded on a recording medium is not limited to the multi picture format, and other recording methods may be employed such as, for example, a method where two image files are correlated with each other using the name or a method where a setting file in which correlation between image files is written is recorded together.

The recording unit 111 records the data generated by the recording data generation unit 110 on the recording medium. The recording medium includes, for example, a detachable semiconductor memory card, an optical disc, or the like. Alternatively, a method of recording data in a database of an external server via a network interface may be employed.

In addition, the recording medium is shown as a configuration positioned outside the image capturing device 100 in FIG. 4, but may be a magnetic recording device such as a hard disk or a semiconductor memory such as a flash memory, built in the image capturing device 100. If the recording process for the recording medium is completed, the flow goes to step S109.

STEP S109

In step S109, it is checked whether or not power is in an OFF state. If it is determined that power is in an OFF state, an operation ends. If it is not determined that power is in an OFF state, the flow goes to step S101 and the process is continued.

As such, in the image capturing device according to the embodiment of the present disclosure, the recording data generation unit 110 or the output data generation unit 107 determines a recall level of stereoscopic vision in 3D image display based on the analysis result of the distance data analysis unit 105, and if the recall level of stereoscopic vision is low, generates a 2D image as a recorded image or an output image, and if the recall level of stereoscopic vision is high, generates a 3D image as a recorded image or an output image.

Specifically, the recording data generation unit 110 or the output data generation unit 107 determines whether or not all pieces or a preset ratio or more pieces of difference data of distance measurement values which are distances to a subject of corresponding coordinate positions of each of the L image and the R image indicate differences smaller than a predefined threshold value.

If it is determined that the difference data indicates differences smaller than the predefined threshold value, it is determined that a recall level of stereoscopic vision in 3D image display is low, the recording data generation unit 110 or the output data generation unit 107 generates a 2D image as a recorded or output image, and if it is determined that the difference data indicates differences which are not smaller than the predefined threshold value, it is determined that the recall level of stereoscopic vision in 3D image display is high, generates a 3D image as a recorded or output image.

2. Process Example Where Two-Dimensional Image is Recorded and Output When Subject Distances are All Long in Captured Image (Second Embodiment)

Next, an embodiment will be described in which a two-dimensional image is recorded and output when subject distances are all long in a captured image, in an image capturing device according to a second embodiment of the present disclosure.

The above-described embodiment has been described as a configuration in which subject distance information at corresponding coordinates of the left eye image (L image) and the right eye image (R image) is compared, and if distance differences to a subject at all the corresponding coordinate positions are smaller than a predetermined threshold value, or distance differences to the subject at the corresponding coordinate positions of a preset corresponding point range (for example, 95%) or more are smaller than a predetermined threshold value, a 2D image is recorded or output to a display device.

In the embodiment described below, instead of comparing distances between the LR images, one image captured by the imaging unit, for example, distance measurement data (subject distance information) of the respective pixels of a left eye image (L image) is compared, and if subjects included in the image are all positioned at a long distance, a 2D mode is set in which a 2D image is recorded and output.

In addition, a configuration of the image capturing device according to the second embodiment is the same as that of the image capturing device according to the first embodiment, wherein an exterior thereof has the exterior shown in FIG. 3A to 3E, and an internal configuration has the configuration shown in FIG. 4.

A process sequence performed by the image capturing device according to the second embodiment will be described with reference to the flowchart shown in FIG. 14.

The flowchart shown in FIG. 14 is common in many parts with the flowchart in the image capturing device according to the first embodiment described referring to FIG. 5.

Different processes are processes in steps S202 and S203.

Processes performed by the image capturing device according to the embodiment will be described with reference to the configuration diagram of the image capturing device shown in FIG. 4 and the flowchart shown in FIG. 14. In addition, the processes in steps common to the first embodiment will be described briefly.

STEP S201

In step S201, an imaging process is performed in parallel by the two imaging units 101 and 102 included in the image capturing device 100 shown in FIG. 4 in response to, for example, a shutter operation of a user.

For example, an image in the right eye viewpoint and an image in the left eye viewpoint are obtained by the imaging units 21A and 21B disposed at the left and right sides of the camera shown in FIG. 3A. In addition, in the block diagram of FIG. 4, the imaging unit 101 images a subject from the left direction and obtains a left eye image (L image), and the imaging unit 102 images the subject from the right direction and obtains a right eye image (R image).

As described with reference to FIGS. 6 to 8, each of the imaging units 101 and 102 includes a plurality of photoelectric conversion cells outputting distance measurement signals through phase difference detection on the imaging element, and obtains distance information to a subject, received on the imaging element, with the photoelectric conversion cell units outputting a plurality of distance measurement signals as well as obtaining image data. The measured distance data is transmitted to the distance data analysis unit 105.

STEPS S202 AND S203

In step S202, one image captured by the imaging unit, for example, distance measurement data (subject distance information) of the respective pixels of a left eye image (L image) is obtained, and it is determined whether or not subjects included in the image are all positioned at a long distance.

This process is different from the process in the first embodiment.

In the embodiment, the distance data analysis unit 105 analyzes distance data of a plurality of distance information obtaining positions set in one image instead of comparing distance data at corresponding coordinate positions of the LR images, and thereby determines whether or not subjects included in the image are all positioned at a long distance.

The distance data analysis unit 105 obtains a plurality of pieces of distance measurement data corresponding to distance measurement points in a captured image from each of the imaging unit 101 and the imaging unit 102. For example, the distance measurement data is data of 7 bits (0 to 127) described with reference to FIG. 6B.

For example, if all the values of the distance measurement points are equal to or more than a threshold value (for example, 120), a determination result is affirmative (Yes) in step S203. Otherwise, a determination result is negative (No).

The distance data analysis unit 105 determines whether or not all pieces of distance measurement data in the image indicate long distance data equal to or more than a preset predetermined threshold value for any one of the LR images obtained from the imaging unit 101 and the imaging unit 102 or each of the two images.

An image for obtaining distance information and performing the determination process may be one of the LR images or the two images.

In addition, in a manner similar to the first embodiment, in the embodiment as well, although a determination process of whether all pieces of the distance measurement data have a distance equal to or more than a predetermined threshold value is performed as the determination process in step S203, there may be a setting of a determination process of whether or not, for example, a portion having a large number of distance measurement points, for example, points equal to or more than 95% have a distance equal to or more than a predetermined threshold value, in consideration of errors in the distance measurement.

In this setting, if 95% or more points of the distance measurement data of an image to be processed have a distance equal to or more than a predetermined threshold value, a determination result is affirmative (Yes) in step S203, and, if otherwise, a determination result is negative (No).

If the determination result in step S203 is affirmative (Yes), that is, all or most of the subjects in the captured image are positioned at a long distance, the flow goes to step S204, and the image capturing device 100 is set to a 2D mode in which a 2D image is recorded and output. If the respective units included in the image capturing device 100 are switched to the 2D mode, the flow goes to step S206.

On the other hand, if the determination result in step S203 is negative (No), that is, it is not determined that all or most of the subjects in the captured image are positioned at a long distance, the flow goes to step S205, and the image capturing device 100 is set to a 3D mode in which a 3D image is recorded and output. If the respective units included in the image capturing device 100 are switched to the 3D mode, the flow goes to step S206.

The subsequent processes are the same as those in the first embodiment, and description thereof will be omitted.

As such, in the embodiment, if the distance measurement values of the image are large, that is, all the subjects are distant, two images are recorded and output as 2D images. This process is a process based on the reason that stereoscopic vision is hardly grasped even if all the subjects which are positioned at a long distance are displayed as a 3D image.

A detailed example will be described with reference to FIGS. 15A to 16C.

FIGS. 15A to 15C show an example of the image captured by the two imaging units when the subject distance is relatively short.

FIGS. 16A to 16C show an example of the image captured by the two imaging units when the subject distance is relatively long.

First, there will be description of an example of the image captured by the two imaging units when the subject distance is relatively short with reference to FIGS. 15A to 15C.

As shown in FIG. 15A, using a camera having an imaging unit 1 and an imaging unit 2 set at predetermined spaced-apart positions, subjects (a figure and a tree) located at positions which are relatively close to the camera are photographed.

If the distance between the imaging units and the subjects are relatively short as shown in FIG. 15A, a range and an angle photographed by the imaging unit 1 and a range and an angle photographed by the imaging unit 2 have relatively great difference with respect to the subjects (the figure and the tree). In this case, as shown in FIGS. 15B and 15C, different images are obtained by the imaging unit 1 and the imaging unit 2.

FIG. 15B shows an image obtained by the imaging unit 1, and FIG. 15C shows an image obtained by the imaging unit 2. The recording positions of the subjects (the figure and the tree) in the two images are clearly different from each other. The difference between the recording positions of the subjects gives clear parallax when the two images are displayed as 3D images, and the images having a sense of depth are presented.

Next, there will be description of an example of the image captured by the two imaging units when the subject distance is relatively long with reference to FIGS. 16A to 16C.

As shown in FIG. 16A, using a camera having an imaging unit 1 and an imaging unit 2 set at predetermined spaced-apart positions, subjects (hills) located at positions which are relatively distant from the camera are photographed.

If the distance between the imaging units and the subjects are relatively long as shown in FIG. 16A, a range and an angle photographed by the imaging unit 1 and a range and an angle photographed by the imaging unit 2 do not have relatively great difference with respect to the subjects (the hills). In this case, as shown in FIGS. 16B and 16C, almost the same images are obtained by the imaging unit 1 and the imaging unit 2.

FIG. 16B shows an image obtained by the imaging unit 1, and FIG. 16C shows an image obtained by the imaging unit 2. The recording positions of the subjects (the hills) in the two images are substantially the same as each other. Even if the two images having little difference between the recording positions of the subjects are displayed as 3D images, the images having no sense of depth are presented without clear parallax.

A value using which parallax is equal to or less than a predetermined value in a place where a subject distance is long is determined in principle depending on performance of a lens as to at what framing a subject is grasped at one time, a gap between two imaging units, or the like, but, in practice, slight parallax is difficult to grasp. Therefore, there are cases where some people do not recognize presence of the parallax and other people recognize presence of the parallax.

For this reason, when the image capturing device is initially used, if a user thinks that there is parallax for himself/herself while deciding framing during photographing or viewing captured images after the photographing, the user manually sets the 3D mode, and if he/she thinks that there is no parallax, sets the 2D mode. Therefore, the user can judge that it is favorable to perform automatic switching to the 2D mode based on how distant the image capturing device is located from a subject, through learning of the pattern, and thereby it is possible to give switching accuracy.

In the embodiment, it is favorable that only distance information output from the image capturing device is analyzed, and a comparison of distance data of two images is not necessary. In the embodiment, it is only determined that the obtained distance information is equal to or more than a predetermined distance value, and thus, as compared with the first embodiment described above, it is possible to perform processes at high speed since there is no comparison operation and determination is possible using only distance information from one imaging unit.

As such, in the image capturing device according to the embodiment of the present disclosure, the recording data generation unit 110 or the output data generation unit 107 determines a recall level of stereoscopic vision in 3D image display based on the analysis result of the distance data analysis unit 105, and if the recall level of stereoscopic vision is low, generates a 2D image as a recorded image or an output image, and if the recall level of stereoscopic vision is high, generates a 3D image as a recorded image or an output image.

Specifically, the distance data analysis unit 105 obtains a plurality of pieces of distance data which are measurement values of a plurality of subject distance measurement points set in at least several images of the L image and the R image.

The recording data generation unit 110 or the output data generation unit 107 determines whether or not all pieces or a preset ratio or more pieces of the distance data have distance data equal to or more than a predefined threshold value indicating that a subject distance is long.

If it is determined that the distance data has distance data equal to or more than the predefined threshold value, it is determined that a recall level of stereoscopic vision in 3D image display is low, the recording data generation unit 110 or the output data generation unit 107 generates a 2D image as a recorded or output image, and if it is determined that the distance data does not have distance data equal to or more than the predefined threshold value, it is determined that the recall level of stereoscopic vision in 3D image display is high, generates a 3D image as a recorded or output image.

3. Modified Examples of First and Second Embodiments
3-1. Process Example Where Measurement Information Only for a Portion of Distance Measurement Points is Considered (Third Embodiment)

In the first and second embodiments described above, the method of measuring a subject distance through the phase difference detection has been described as a process example of obtaining information of all measurement points.

Instead of obtaining information of all the distance measurement points in this way, there may be a configuration in which a determination of whether a 2D mode or a 3D mode is set is performed by obtaining only distance measurement information of a portion of distance measurement points.

In the above-described first and second embodiments, the process is performed targeting data of all distance measurement points, such as the distance comparison process of corresponding points of the LR images for all the distance measurement points or determination of whether or not all the distance measurement points in one image are equal to or more than a predetermined value. Instead of performing a process targeting all the distance measurement points, there may be a configuration in which, for example, only distance measurement points of not a blur but a focused part, or a configuration in which a determination of whether or not a 2D mode or a 3D mode is set by taking only a portion of distance measurement points on an object selected by a user as process targets.

3-2. Process Example for Recording Data After Photographing (Fourth Embodiment)

The process examples in the above-described first and second embodiments have been described as a process of controlling whether, when a new image is captured in the image capturing device, recording or display of the captured image is performed in a 2D mode or a 3D mode.

However, this process may be applied to a captured image which has already been stored on a recording medium or a memory after being captured. That is to say, there may be a configuration in which images which have already been captured and stored on the recording medium as an image pair of left eye image (L image) and right eye image (R image) are read, the recorded images are verified, and the images are rerecorded or displayed in a 2D mode, or are rerecorded or display again in a 3D mode. Hereinafter, the process example will be described.

As a premise of a case of performing the process, the image capturing device performs photographing in a 3D mode at the time of the photographing, records an image pair of left eye image (L image) and right eye image (R image) on the recording medium, and, when the recording process is performed, distance information described referring to FIG. 10 is recorded together as attribute information (metadata) for the images, for example, as metadata of EXIF.

In addition, the process using the recorded data is not limited to the image capturing device and can be performed in an image processing device which performs image display, editing, reproduction, and the like, and, for example, can be performed in a device such as a PC or a television.

Figure 17:
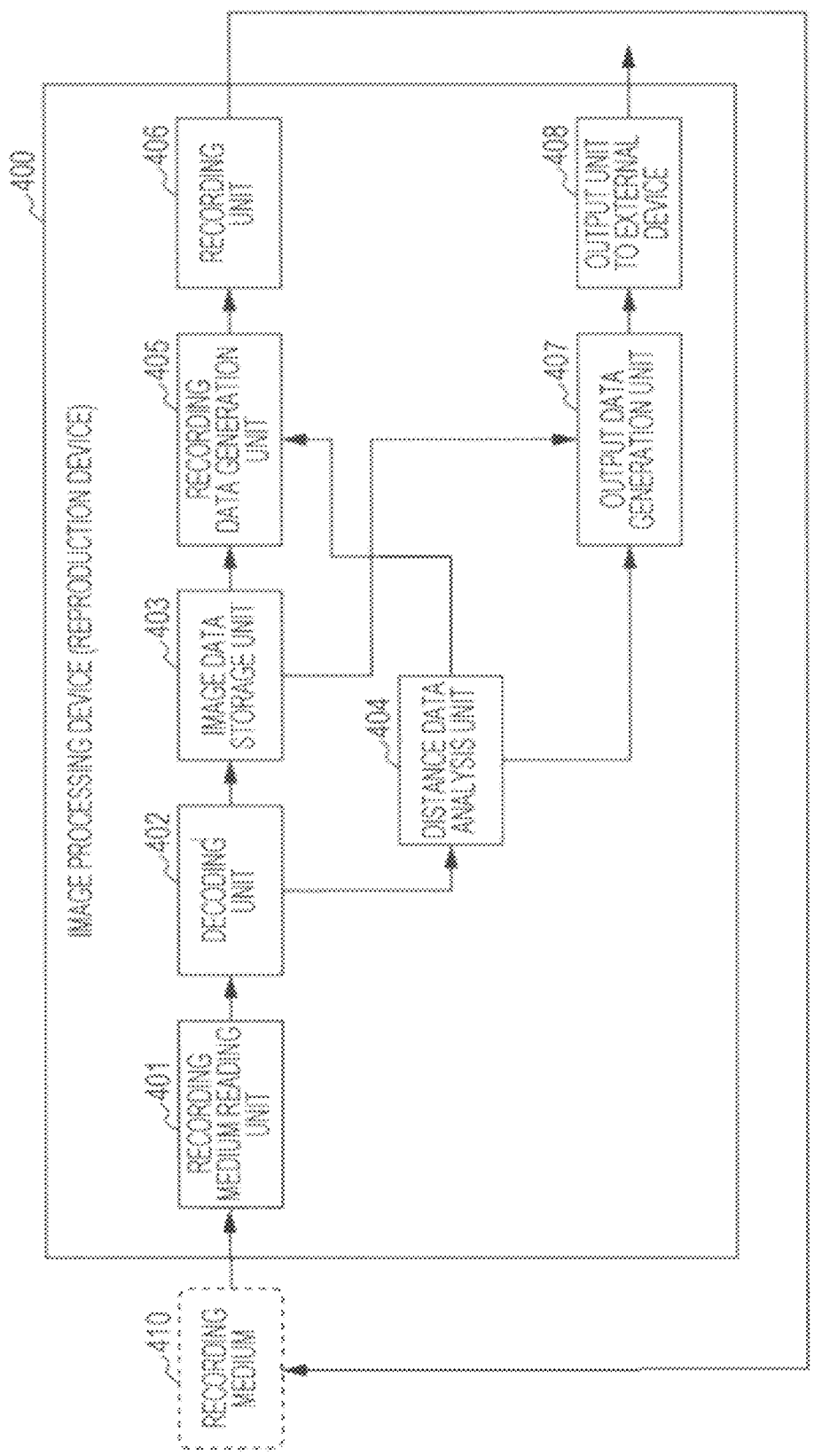
FIG. 17 is a diagram illustrating a functional block diagram of an image processing device (reproduction device) according to a fourth embodiment of the present disclosure.

FIG. 17 shows a functional block diagram of an image processing device (reproduction device) 400 according to the fourth embodiment.

Figure 18:
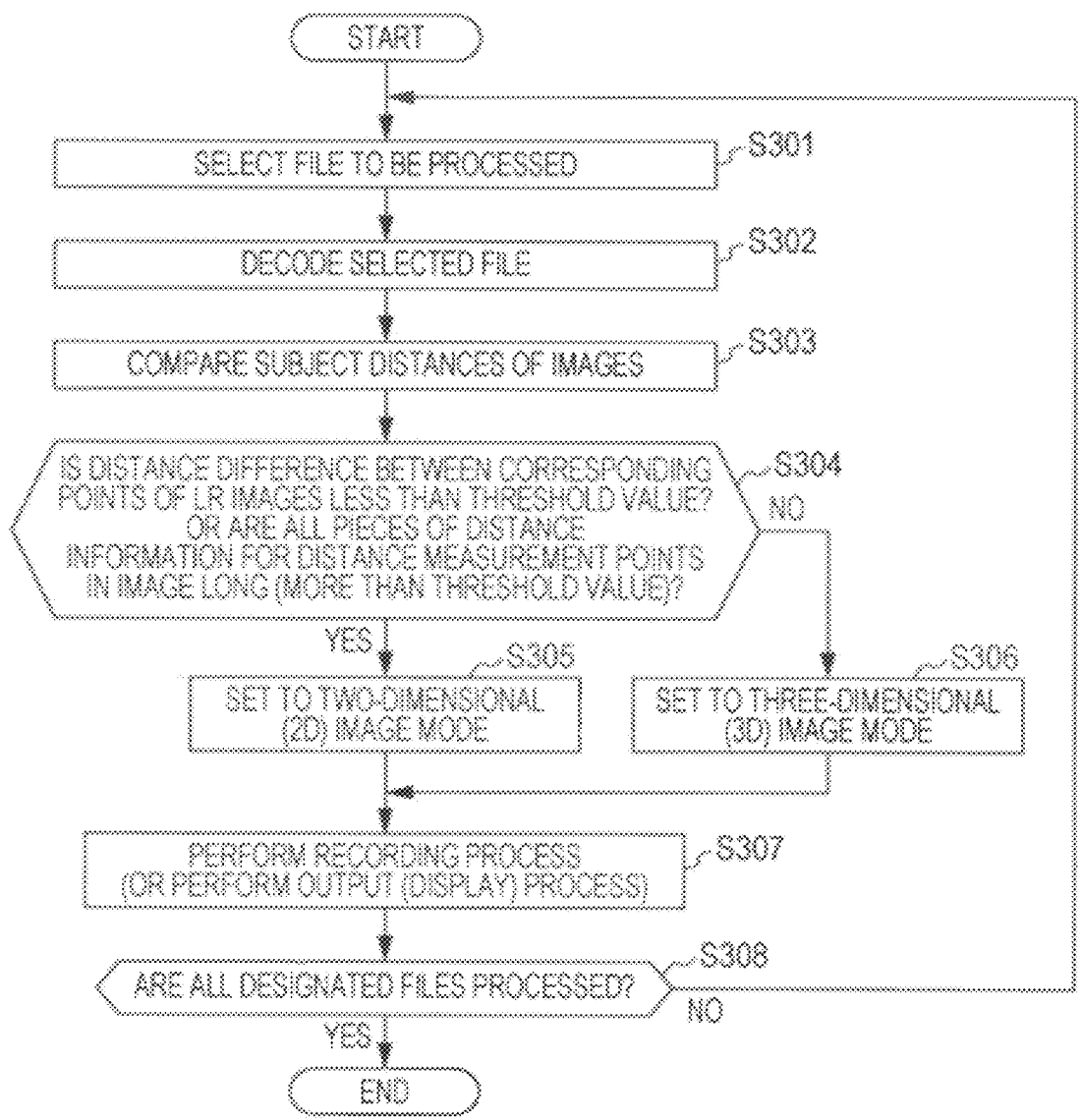
FIG. 18 is a flowchart illustrating a process sequence performed by the image processing device (reproduction device) according to the fourth embodiment of the present disclosure.

Further, FIG. 18 shows a flowchart illustrating a process sequence of an image rerecording process or an output (display) process performed by the image processing device 400 shown in FIG. 17.

As shown in FIG. 17, the image processing device 400 includes a recording medium reading unit 401, a decoding unit 402, an image data storage unit 403, a distance data analysis unit 404, a recording data generation unit 405, a recording unit 406, an output data generation unit 407, and an output unit 408 to an external device (hereinafter, simply referred to as an output unit 408).

The recording medium reading unit 401 reads image data from a recording medium 410 which records an image pair of left eye image (L image) and right eye image (R image) as 3D images and distance information as metadata corresponding to each image.

The decoding unit 402 decodes the data read by the recording medium reading unit 401. The decoded result includes the image pair of left eye image (L image) and right eye image (R image) as 3D images and the distance information as metadata corresponding to each image.

The image data is stored in the image data storage unit 403.

The distance information is provided to the distance data analysis unit 404.

The recording data generation unit 405 receives the image data stored in the image data storage unit 403 and receives distance comparison result information processed by the distance data analysis unit 404, and generates rerecording data based on the distance comparison result information. That is to say, 2D image data or 3D image data is generated as recording data based on the distance comparison result information.

The recording unit 406 records the 2D image data or the 3D image data generated by the recording data generation unit 405 on the recording medium 410.

The output data generation unit 407 receives the image data stored in the image data storage unit 403 and receives the distance comparison result information processed by the distance data analysis unit 404, and generates output (display) data based on the distance comparison result information. That is to say, 2D image data or 3D image data is generated as output data based on the distance comparison result information.

Next, a process sequence performed by the image processing device shown in FIG. 17 will be described with reference to the flowchart shown in FIG. 18.

In addition, the processes are performed under the control of a control unit which is not shown in FIG. 17 according to a program stored in a memory.

The processes according to the flowchart shown in FIG. 18 starts automatically when there is a margin for a process of the device after the image processing device 400 records 3D data on the recording medium, or as a trigger of when a user selects a start process, of when the recording medium 410 such as a memory card is inserted into the image processing device 400, or the like.

STEP S301

First, in step S301, the recording medium reading unit 401 reads a file to be processed from the recording medium. The read file data includes an image pair of left eye image (L image) and right eye image (R image) as 3D images and distance information as metadata corresponding to each image.

In addition, as the file to be processed, for example, file information read by the recording medium reading unit 401 is checked, and a file which is the oldest and has not undergone the process according to the embodiments of the present disclosure is selected from files written in a 3D format. The recording date can be grasped by reading the metadata such as EXIF.

In addition, there may be a configuration in which a flag indicating whether or not rerecording process according to this process flow has been performed is buried as metadata such as EXIF, the flag is verified, and if it is confirmed that data has not been processed, the data is selected and read.

In addition, selection may be performed using other methods, such as a method where a list of files read by the recording medium reading unit 401 is displayed on a display device which is not shown in FIG. 17, and a user selects a file to be processed.

STEP S302

Next, in step S302, the decoding unit 402 decodes the data read by the recording medium reading unit 401. The decoded result includes the image pair of the left eye image (L image) and the right eye image (R image) as 3D images and the distance information as metadata corresponding to each image.

Specifically, for example, left and right image data is extracted from data of a 3D format stored in the MPO format and is decoded, and the left eye image data and right eye image data are transmitted to the image data storage unit 403. In addition, distance measurement data buried in EXIF as metadata is obtained and is transmitted to the distance data analysis unit 404. Further, the image data storage unit 403 storing image data includes a semiconductor memory and can temporarily store left images and right images. If transmission of the image data and the distance measurement data is completed, the flow goes to step S303.

STEP S303

Next, in step S303, the distance data analysis unit 404 compares distance data.

The distance data comparison process is performed as the process described in the first embodiment, or several processes described in the second embodiment.

For example, in a case of performing the process described in the first embodiment, distances between the corresponding coordinate positions of the left eye image (L image) and right eye image (R image) are compared.

On the other hand, in a case of performing the process described in the second embodiment, distances of the distance measurement points in one image of the left eye image (L image) and the right eye image (R image) are detected.

STEPS S304 TO S306

In step S304, a determination based on the distance information analysis process performed in step S303 is performed.

In a case where the process described in the first embodiment is performed in step S303, that is, the distance information of corresponding coordinates of the left eye image (L image) and the right eye image (R image) is compared, it is determined whether or not all or a predefined threshold value (for example, 95% of all) or more of distance differences of the corresponding points of the L image and the R image are smaller than a preset threshold value.

If the distance measurement data of the compared corresponding points is the same, or the display result includes all or the threshold value or more of corresponding pixels within an error range (for example, within an error ±5 in the distance measurement value of 7 bits (0 to 127)) which can be regarded to be equivalent to the human eye, a determination result is affirmative (Yes) in step S304, and the flow goes to step S305, where the image capturing device 400 is set to a 2D mode in which a 2D image is recorded and output.

Otherwise, a determination result is negative (No) in step S304, the flow goes to step S306, where the image processing device 400 is set to a 3D mode in which a 3D image is recorded and output.

On the other hand, in a case of performing the process described in the second embodiment in step S303, that is, a determination process of distance values obtained at the subject distance measurement points set in at least one of the left eye image (L image) and the right eye image (R image) is performed, it is determined whether or not all (or a predetermined number or more) of them are equal to or more than a preset threshold value, that is, a distant subject is photographed.

If the determination result is affirmative (Yes) in step S304, that is, it is determined that all or most of the subjects included in the captured image are distant subjects, the flow goes to step S305, where the image processing device 400 is set to a 2D mode in which a 2D image is recorded and output.

On the other hand, if the determination result is negative (No) in step S304, that is, it is not determined that all or most of the subjects included in the captured image are distant subjects, the flow goes to step S306, where the image processing device 400 is set to a 3D mode in which a 3D image is recorded and output.

STEP S307

In step S307, the image data is rerecorded on the recording medium or is output (displayed) according to the mode set in step S305 or S306.

That is to say, if the 2D image mode is set in step S305, the data is recorded or output as a 2D image. The process of recording or outputting the 2D image is performed by recording or outputting (displaying) only one of, for example, LR images.

In addition, with regard to which one of the LR images is set as an image to be recorded or output in the 2D mode, as in the embodiment described above, any one of left eye image data and right eye image data may be set by the device, or a user may select one of the two. A format of the image data is selected as a recording target is converted into an image compression format such as, for example, a JPEG format, is transmitted to the recording unit 406, and then is recorded on the recording medium 410.

In addition, in a case where a mode of the image processing device 400 is set to the 3D mode, the recording data generation unit 405 obtains both of the image data of left eye image data and right eye image data stored in the imaging data storage unit 403, and converts a format of each piece of the image data into an image compression format such as a JPEG format and further converts a format of the image data into a format for recording a plurality of files as one file. For example, the format is a multi picture format (MPO), defined by CIPA, or the like for recording a plurality of JPEG images as one file. The obtained data is transmitted to the recording unit 406 and is recorded on the recording medium 410.

In addition, a format of data recorded on the recording medium 410 is not limited to the multi picture format, and other recording methods may be employed such as, for example, a method where two image files are correlated with each other using the name or a method where a setting file in which correlation between image files is written is recorded together.

The recording unit 406 records the data generated by the recording data generation unit 405 on the recording medium 410. The recording medium includes, for example, a detachable semiconductor memory card, an optical disc, or the like. Alternatively, a method of recording data in a database of an external server via a network interface may be employed.

In addition, the recording medium 410 is shown as a configuration positioned outside the image capturing device (reproduction device) 400 in FIG. 17, but may be any other type, such as a magnetic recording device such as a hard disk or a semiconductor memory such as a flash memory built in the image processing device (reproduction device) 400. If the recording or outputting process is completed, the flow goes to step S308.

STEP S308

In step S308, it is determined whether or not a process of all of the designated files is completed. If it is determined that the process is completed, the operation ends. If there are files which are not processed, the flow goes to step S301, and the process is continued.

A value of a flag indicating the process completion is set to the files for which the rerecording process is performed based on the distance information, and, the flag is recorded as metadata such as, for example, EXIF. The recording data generation unit 405 can determine process situations of each file based on a value of the flag.

4. Configuration Example of Device Performing Processes According to Program (Software)

Next, a hardware configuration example of the image capturing device or the image processing device according to the embodiments of the present disclosure will be described with reference to FIG. 19.

The image processing device 500 shown in FIG. 19 is an image capturing device having a reproduction function, and includes a CPU (Central Processing Unit) 563 which is a control unit executing a program (software).

The program is stored in, for example, a nonvolatile memory 562. The CPU 563 uses a high-speed memory 561 constituted by, for example, a DDR SDRAM (Double-Data-Rate Synchronous Dynamic Random Access Memory) or the like, which is accessible at relatively high speed, as a work area, develops the program read from the nonvolatile memory 562 thereon, and analyzes distance information of an image.

In addition, data is transmitted among the respective constituent elements shown in the image processing device 500 in FIG. 19 via a bus under the control of the CPU 563 or according to an adjustment function embedded in a bus I/F 564.

Imaging units 501 and 502 respectively receive incident light (left) 581 and incident light (right) 582, and capture images having different viewpoints, that is, a left eye image (L image) and a right eye image (R image).

Image data storage units 503 and 504 store the LR images.

Input unit 506 receives an instruction input 583 from a user, for example, a recording command.

The CPU 563 analyzes distance information corresponding to the LR images stored in the imaging data storage units 503 and 504 according to the program. That is to say, the analysis process of distance information according to the above-described embodiments is performed.

The recording data generation unit 510 obtains the LR images stored in the image data storage units 503 and 504, receives the distance information analysis generated by the CPU 563, determines whether or not a recorded image is set to a 2D image or a 3D image, and generates recording data based on the determination result. The generated recording data is recorded on a recording medium 584.

In addition, the determination process of whether or not a recorded image is set to a 2D image or a 3D image is performed by any one of the processes described in the above embodiments.

The output data generation unit 507 obtains the LR images stored in the image data storage units 503 and 504, receives the distance information analysis generated by the CPU 563, determines whether or not an output image is set to a 2D image or a 3D image, and generates output data based on the determination result. The generated output data is output to an external output device 591 via an output device 508 to an external device. Alternatively, the generated output data is displayed on a display unit 509.

In addition, the determination process of whether or not a recorded image is set to a 2D image or a 3D image is performed by any one of the processes described in the above embodiments.

A recording medium reading unit 551 reads data from the recording medium 584. A recording data decoding unit 552 decodes the read data and stores the decoded result in the image data storage unit 553.

In a case where the image data stored in the image data storage unit 553 is rerecorded or output (displayed), in a manner similar as the process described with reference to FIGS. 17 and 18, distance information recorded as metadata corresponding to an image is analyzed, and the image data is rerecorded or output (displayed) as a 2D image or a 3D image.

When this process is performed, the CPU (control unit) 563 performs the process according to the program stored in the nonvolatile memory 562.

The recording data generation unit 510 determines whether or not a rerecorded data format is set to a 2D image or a 3D image based on the distance information analysis result from the CPU 563, and generates recording data.

In the same manner, the output data generation unit 507 determines whether or not a rerecorded data format is set to a 2D image or a 3D image based on the distance information analysis result from the CPU 563, and generates output data.

This process is the same sequence as the sequence described with reference to FIG. 18.

As above, the present disclosure has been described in detail with reference to the specific embodiments. However, it is clear that a person skilled in the art can modify or alter the embodiments within the scope not departing from the spirit of the present disclosure. In other words, the present disclosure is disclosed as exemplary embodiments and thus should not be construed as limiting the scope thereof. The appended claims should be considered in order to judge the spirit of the present disclosure.

Meanwhile, in the specification, the above-described series of processes may be performed by hardware or software. When a series of processes is performed by the software, the processes can be executed by installing a program recording the process sequence thereon to a memory of a computer built in dedicated hardware, or, for example, by installing the program to a general personal computer which can execute various kinds of functions. For example, the program may be recorded on a recording medium in advance. In addition to installing the program to the computer, the program may be received via a network such as a LAN (Local Area Network) or the Internet and be installed to a recording medium such as built-in hard disk.

Further, a variety of processes disclosed in the present specification may be performed not only in a time series according to the described order, but also in parallel or separately depending on processing performance of a device executing the processes or as necessary. In addition, the system in the present specification refers to a logical assemblage configuration of a plurality of devices, and is not limited to being included in the same casing.

The present disclosure contains subject matter related to that disclosed in Japanese Priority Patent Application JP 2010-274806 filed in the Japan Patent Office on Dec. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a distance data analysis unit, implemented by processing circuitry, that analyzes subject distance information with the partial region units of captured images having different viewpoints and outputs a distance analysis result; and
   a data generation unit, implemented by the processing circuitry, that determines whether or not a recorded image or an output image will be set to a two-dimensional image or a three-dimensional image depending on the distance analysis result of the distance data analysis unit, and generates the recorded image or the output image based on the determination result,
   wherein the data generation unit determines a perception level of stereoscopic vision in three-dimensional display based on the distance analysis result of the distance data analysis unit, and if it is determined from the distance analysis result that the perception level of stereoscopic vision is low, generates a two-dimensional image as the recorded image or the output image, and if it is determined from the distance analysis result that the perception level of stereoscopic vision is high, generates a three-dimensional image as the recorded image or the output image.

2. The image processing device according to claim 1,
   wherein the distance data analysis unit calculates difference data of distance measurement values which are distances to a subject of corresponding coordinate positions of each of an L image and an R image which are images having different viewpoints, and
   wherein the data generation unit determines whether or not all pieces or a preset ratio or more pieces of the difference data of the distance measurement values which are distances to a subject of corresponding coordinate positions of each of the L image and the R image, obtained as a result of analysis of the distance data analysis unit, indicate differences smaller than a predefined threshold value, and if it is determined that the difference data indicates differences smaller than the predefined threshold value, it is determined that the perception level of stereoscopic vision in three-dimensional image display is low and the data generation unit generates a two-dimensional image as the recorded image or the output image, and if it is determined that the difference data indicates differences which are not smaller than the predefined threshold value, it is determined that the perception level of stereoscopic vision in three-dimensional image display is high, and the data generation unit generates a three-dimensional image as the recorded image or the output image.

3. The image processing device according to claim 1, wherein the distance data analysis unit obtains a plurality of pieces of distance data which are measurement values of a plurality of subject distance measurement points set in at least one of an L image and an R image which are images having different viewpoints,
   wherein the data generation unit determines whether or not all pieces or a preset ratio or more pieces of the distance data have distance data equal to or more than a predefined threshold value indicating that a subject distance is long, and if it is determined that the distance data has distance data equal to or more than the predefined threshold value, it is determined that a perception level of stereoscopic vision in three-dimensional image display is low, and the data generation unit generates a two-dimensional image as the recorded image or the output image, and if it is determined that the distance data does not have distance data equal to or more than the predefined threshold value, it is determined that the perception level of stereoscopic vision in three-dimensional image display is high, and the data generation unit generates a three-dimensional image as the recorded image or the output image.

4. The image processing device according to claim 1, further comprising two imaging units that capture images having different viewpoints,
wherein each of the imaging units includes an imaging element which obtains subject distance information with the partial region units of an image.

5. The image processing device according to claim 4, wherein each of the imaging units includes an imaging element having a pixel region which obtains subject distance information with the partial region units of an image according to a phase difference detection method.

6. The image processing device according to claim 1, wherein the distance data analysis unit selects a partial image region of an image and analyzes subject distance information only for the selected region, wherein the data generation unit determines whether a recorded image or an output image is set to a two-dimensional image or set to a three-dimensional image depending on the analysis result of only the selected region, and generates the recorded data or the output data based on the determination result.

7. The image processing device according to claim 6, wherein the distance data analysis unit selects a focused image region and analyzes subject distance information only for the selected region, wherein the data generation unit determines whether a recorded image or an output image is set to a two-dimensional image or set to a three-dimensional image depending on the analysis result of only the selected region, and generates the recorded data or the output data based on the determination result.

8. The image processing device according to claim 1, wherein the data generation unit determines the perception level of stereoscopic vision in three-dimensional display based on the distance analysis result of the distance data analysis unit such that the perception level of stereoscopic vision is low when a distance is equal to or greater than a threshold and the perception level of stereoscopic vision is high when the distance is less than the threshold.

9. An image processing method executed in an image processing device comprising:
analyzing, using processing circuitry, subject distance information with the partial region units of captured images having different viewpoints and outputting a distance analysis result; and
determining, using the processing circuitry, whether a recorded image or an output image will be set to a two-dimensional image or set to a three-dimensional image depending on the distance analysis result, and
generating, using the processing circuitry, the recorded image or the output image based on the determination result,
wherein the generating of data includes
determining a perception level of stereoscopic vision in three-dimensional display based on the distance analysis result
if it is determined from the distance analysis result that the perception level of stereoscopic vision is low, generating a two-dimensional image as the recorded image or the output image, and
if it is determined from the distance analysis result that the perception level of stereoscopic vision is high, generating a three-dimensional image as the recorded image or the output image.

10. A non-transitory computer readable medium having stored thereon a program enabling an image process to be executed in an image processing device, comprising:
analyzing, using processing circuitry, subject distance information with the partial region units of captured images having different viewpoints and outputting a distance analysis result; and
determining, using the processing circuitry, whether a recorded image or an output image is set to a two-dimensional image or set to a three-dimensional image depending on the distance analysis result, and
generating, using the processing circuitry, the recorded image or the output image based on the determination result,
wherein the generating of data includes
determining a perception level of stereoscopic vision in three-dimensional display based on the distance analysis result,
if it is determined from the distance analysis result that the perception level of stereoscopic vision is low, generating a two-dimensional image as the recorded image or the output image, and
if it is determined from the distance analysis result that the perception level of stereoscopic vision is high, generating a three-dimensional image as the recorded image or the output image.

\* \* \* \* \*